(12) United States Patent
Szarski

(10) Patent No.: US 12,327,344 B2
(45) Date of Patent: Jun. 10, 2025

(54) NATURAL FEATURE PICK AND PLACE SYSTEM FOR COMPOSITE MATERIALS

(71) Applicant: The Boeing Company, Chicago, IL (US)

(72) Inventor: Martin Alexander Szarski, Brighton East (AU)

(73) Assignee: The Boeing Company, Chicago, IL (US)

( * ) Notice: Subject to any disclaimer, the term of this patent is extended or adjusted under 35 U.S.C. 154(b) by 470 days.

(21) Appl. No.: 17/823,691

(22) Filed: Aug. 31, 2022

(65) Prior Publication Data

US 2024/0070837 A1 Feb. 29, 2024

(51) Int. Cl.
B29C 70/54 (2006.01)
B29C 70/38 (2006.01)
G06T 7/00 (2017.01)
B29C 37/00 (2006.01)

(52) U.S. Cl.
CPC .......... G06T 7/0004 (2013.01); B29C 70/382 (2013.01); B29C 70/541 (2013.01); B29C 70/545 (2013.01); B29C 2037/903 (2013.01)

(58) Field of Classification Search
CPC ... G06T 7/0004; B29C 70/382; B29C 70/541; B29C 70/545; B29C 2037/903; B29C 2793/0081; B29C 70/38
See application file for complete search history.

(56) References Cited

U.S. PATENT DOCUMENTS

| 4,947,351 A * | 8/1990 | Moran ................. G01S 7/52026 |
| | | 73/602 |
| 5,033,014 A * | 7/1991 | Carver .................... G06T 17/00 |
| | | 700/86 |
| 5,209,804 A * | 5/1993 | Trudeau .................. B29C 70/30 |
| | | 156/364 |
| 6,484,776 B1 * | 11/2002 | Meilunas ............... B32B 37/00 |
| | | 156/581 |
| 6,591,197 B2 * | 7/2003 | Trudeau ................ B29C 70/543 |
| | | 702/33 |
| 6,681,151 B1 | 1/2004 | Weinzimmer et al. |
| 7,513,964 B2 | 4/2009 | Ritter et al. |
| 7,835,567 B2 | 11/2010 | Oldani |
| 9,827,688 B2 | 11/2017 | Bain et al. |

(Continued)

FOREIGN PATENT DOCUMENTS

DE 102013104609 B4 10/2016
WO WO202174186 A9 6/2021

OTHER PUBLICATIONS

Bain et al., "Printed Fiducial System For Accurate Pick and Place," U.S. Appl. No. 17/450,785, filed Oct. 13, 2021, 87 pages.

(Continued)

Primary Examiner — Roy M Punnoose
(74) Attorney, Agent, or Firm — Yee & Associates, P.C.

(57) ABSTRACT

A method, apparatus, system, and computer program product for processing a composite ply. An image of the composite ply is received. Natural features in the image of the composite ply are detected. Feature data for the natural features detected in association is saved with a ply identifier for the composite ply in a repository. The feature data is used to position the composite ply during manufacturing of a composite part using the composite ply.

24 Claims, 15 Drawing Sheets

(56) References Cited

U.S. PATENT DOCUMENTS

| | | | |
|---|---|---|---|
| 9,873,230 B1* | 1/2018 | DesJardien | B29C 70/38 |
| 9,969,131 B2* | 5/2018 | Samak Sangari | B25J 15/0085 |
| 10,197,987 B2 | 2/2019 | Battles et al. | |
| 10,272,637 B2 | 4/2019 | Bolsee | |
| 10,442,087 B1 | 10/2019 | Sweeney | |
| 10,710,318 B2 | 7/2020 | Stone et al. | |
| 11,472,139 B2* | 10/2022 | Suriyaarachchi | B29C 70/38 |
| 12,066,819 B2* | 8/2024 | Bain | G05B 19/4188 |
| 2002/0185785 A1 | 12/2002 | Thrash et al. | |
| 2005/0013472 A1* | 1/2005 | Gauthier | G05B 19/4183 |
| | | | 382/110 |
| 2005/0031158 A1* | 2/2005 | Biernacki | G06T 7/0004 |
| | | | 382/100 |
| 2007/0119518 A1* | 5/2007 | Carman | B07C 5/14 |
| | | | 144/356 |
| 2007/0236354 A1* | 10/2007 | Green | B29C 70/543 |
| | | | 235/375 |
| 2011/0089591 A1 | 4/2011 | Gordon et al. | |
| 2016/0274564 A1 | 9/2016 | Schultz | |
| 2016/0297171 A1 | 10/2016 | Bolsee | |
| 2017/0060115 A1 | 3/2017 | Battles et al. | |
| 2018/0290393 A1 | 10/2018 | Bloch et al. | |
| 2020/0226741 A1* | 7/2020 | Correia Villa Real | G06T 7/62 |
| 2020/0250893 A1* | 8/2020 | Bernardon | G06T 7/74 |
| 2021/0354404 A1 | 11/2021 | Suriyaarachchi et al. | |
| 2022/0089237 A1 | 3/2022 | Sverdlov et al. | |
| 2022/0258437 A1 | 8/2022 | Kremers et al. | |
| 2023/0059269 A1 | 2/2023 | Hollis | |

OTHER PUBLICATIONS

Eastman Machine Company, Eagle C125 Cutting Machine Operator's Manual, 2017, URL: (Year: 2017).

Eastmancuts, "Eastman C125 conveyor cutting system—Sunbrella" YouTube video, 2015, screenshot at timestamp 0:54, URL:< https://www.youtube.com/watch?v=Wv5oFu43rOw> (Year: 2015).

Eastmancuts, "Eastman C125 conveyor cutting system—Sunbrella" YouTube video, 2015, screenshot at timestamp 1:05, URL:< https://www.youtube.com/watch?v=Wv5oFu43rOw> (Year: 2015).

Eastmancuts, "Eastman C125 conveyor cutting system—Sunbrella" YouTube video, 2015, screenshot at timestamp 2:46, URL:< https://www.youtube.com/watch?v=Wv5oFu43rOw> (Year: 2015).

Eastmancuts, "Eastman C125 conveyor cutting system—Sunbrella" YouTube video, 2015, screenshot at timestamp 5:03, URL:< https://www.youtube.com/watch?v=Wv5oFu43rOw> (Year: 2015).

Notice of Allowance, dated May 1, 2024, regarding U.S. Appl. No. 17/450,785, 11 pages.

Office Action, dated Feb. 21, 2024, regarding U.S. Appl. No. 17/450,785, 66 pages.

Final Office Action, dated Aug. 14, 2023, regarding U.S. Appl. No. 17/450,785, 69 pages.

Office Action, dated Apr. 14, 2023, regarding U.S. Appl. No. 17/450,785, 78 pages.

European Patent Office Extended Search Report, dated Jan. 9, 2023, regarding Application No. EP22184624.9, 8 pages.

* cited by examiner

NATURAL FEATURE PICK AND PLACE SYSTEM FOR COMPOSITE MATERIALS

BACKGROUND INFORMATION

1. Field

The present disclosure relates generally to manufacturing aircraft and in particular, to a method, apparatus, system, and computer program product for manufacturing composite parts for aircraft.

2. Background

Composite materials comprised of carbon fiber can be dry or in a prepreg form in which is a resin infused in the carbon fiber material. These composite materials can take the form of plies. These plies can be cut into desired shapes and laid up the tool. The plies in the tool can be cured to form a composite part.

This process of forming a composite part involves numerous steps in which a ply is handled. A human operator can lay up a ply in a work area such as a cutter flatbed where a cutter can be applied to a shape with desired dimensions. When the size of the cut is large, a human operator or multiple human operators remove the ply from the scrap material and transport the ply to another location for further processing or storage. This process may involve rolling and folding the ply when acceptable. In other processing, the ply may be placed on a tool in which the boundaries of the ply are aligned to laser projections.

This type of processing using human operators can be slower and more tedious than desired. Further, this process is labor-intensive, and plies can be easily damaged during handling.

Automated systems can be used to handle the plies. For example, an end effector on a robotic system can perform pick and place operations in which an end effector with adhesion surface, such as a vacuum, can move the plies to different locations and positions the plies for processing. These automated systems can have errors in accurately positioning composite plies during different operations. These errors can result in the final composite part then out of tolerance.

Therefore, it would be desirable to have a method and apparatus that take into account at least some of the issues discussed above, as well as other possible issues. For example, it would be desirable to have a method and apparatus that overcome a technical problem with placing composite plies within the desired tolerances for manufacturing composite parts.

SUMMARY

An embodiment of the present disclosure provides a method for processing a composite ply. An image of the composite ply is received. Natural features in the image of the composite ply are detected. Feature data for the natural features detected in association is saved with a ply identifier for the composite ply in a repository. The feature data is used to position the composite ply during manufacturing of a composite part using the composite ply.

Another embodiment of the present disclosure provides a method for processing a composite ply. Natural features are detected on the composite ply in a first image of the composite ply. The image is generated by a camera at a current position for the composite ply. The composite ply is positioned by a placement device using the natural features detected in a second image generated for the placement device at a device position for the placement device.

According to another illustrative embodiment, a composite manufacturing system comprises a computer system and a fabrication controller in the computer system. The fabrication controller operates to receive an image of the composite ply; detect natural features in the image of the composite ply; save feature data for the natural features detected in association with a ply identifier for the composite ply in a repository. The feature data is used to position the composite ply during manufacturing of a composite part using the composite ply.

In yet another illustrative embodiment, a composite manufacturing system for processing a composite ply comprises fabrication equipment and a fabrication controller in a computer system. The fabrication controller controls fabrication equipment to detect natural features on the composite ply in a first image of the composite ply. The first image is generated by a camera at a current position for the composite ply. The fabrication controller controls the fabrication equipment to position the composite ply by a placement device using the natural features detected in a second image generated for the placement device at a device position for the placement device.

Features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
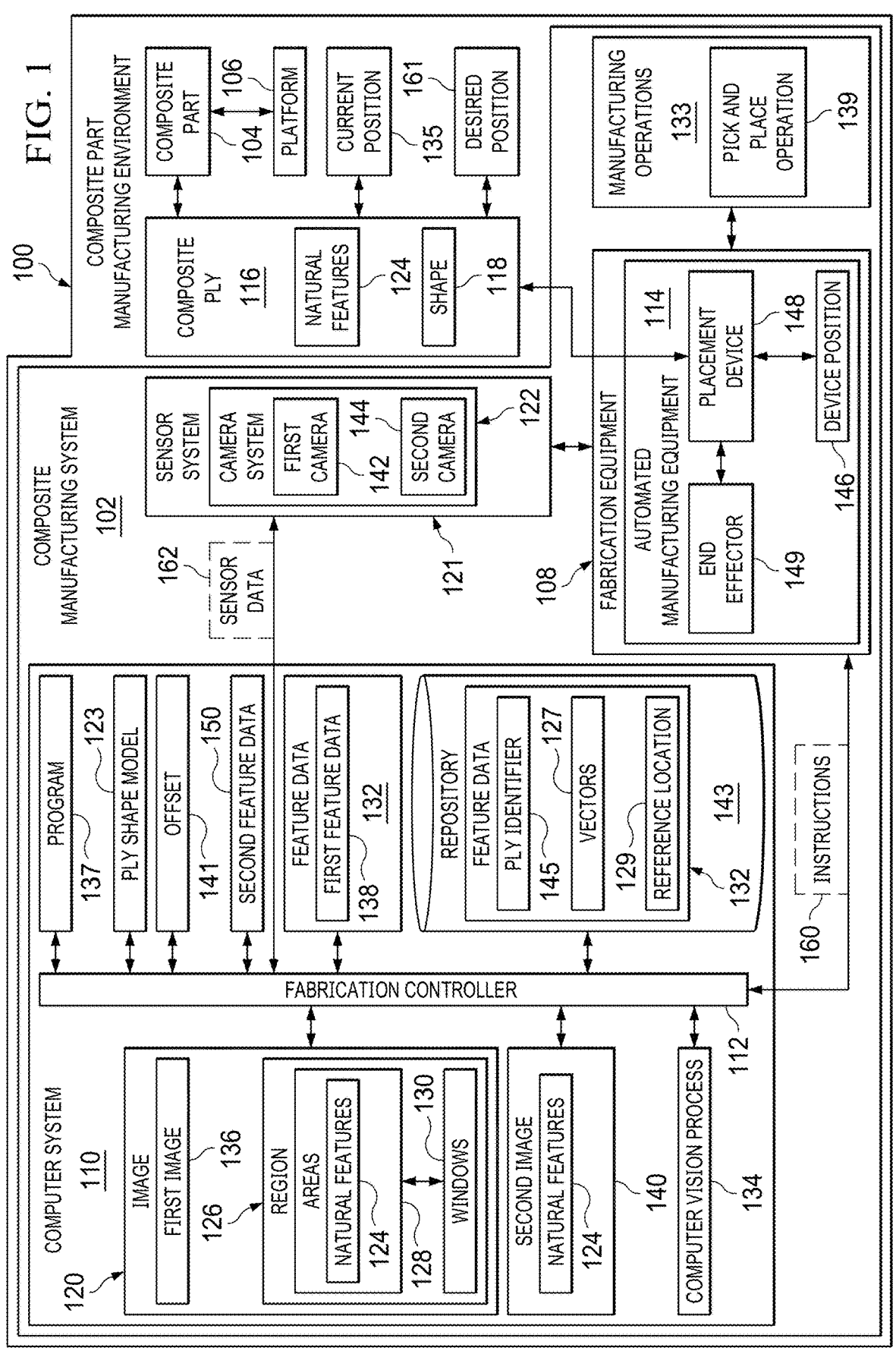
FIG. 1 is an illustration of a block diagram of composite part manufacturing environment in accordance with an illustrative embodiment.

The illustrative embodiments recognize and take into account one or more different considerations as described below. For example, the illustrative embodiments recognize and take into account that currently used automation systems or handling composite plies can have errors that are cumulative at different steps such that the final positioning can be out of tolerance. These errors can be errors in ply cutter positioning, errors in cutting of the composite material, robot calibration errors, errors in robot alignment to pick areas, and positioning errors in other operations that involve moving or handling composite plies. For example, positioning errors can also occur during storage unit movement, movement of the ply to a pick zone on a belt, and other types of operations that move or position the composite ply.

The illustrative embodiments recognize and take into account that errors, even small errors, occurring during different operations in which a composite ply or layup of composite plies are moved can accumulate. This accumulation of errors can result in the final positioning being out of tolerance.

The illustrative embodiments recognize and take into account that automated processing of plies involve cutting sheets of composite material to create plies shapes, moving the plies to storage using a robot, placing the plies in storage, picking stored plies, placing the plies on a tool, and other operations. The illustrative embodiments recognize and take into account that these and other operations performed to manufacture composite parts result in the accumulated errors that make maintaining required positional tolerance very difficult.

The illustrative embodiments also recognize and take into account that one manner in which errors can be reduced include scanning or identifying a ply boundary for a composite ply while the composite ply is secured to a robot and the factor after a pick operation. Those embodiments recognize and take into account that the scanning of the boundary of the composite ply can be used to determine an as picked position for the composite ply.

Further, the illustrative embodiments recognize and take into account that boundary scanning of plies can remove positional errors from previous operations. However, but cut quality, cutter calibration, and errors from calculations of the new position often do not provide a level of accuracy that meets tolerances for manufacturing a composite part.

The illustrative embodiments also recognize and take into account that a marker can be printed on a ply. Printed markers, also referred to as fiducial markers, involve using ink or other chemicals to generate one or more markers on a composite ply that can be used for indexing in a manner that increases the accuracy in positioning the composite ply during operations performed to form a composite material such as a charge.

Additionally, the illustrative embodiments recognize and take into account that this type of marking involves adding chemicals to the composite ply. The use of chemicals can reduce mechanical performance of the final composite part.

Thus, illustrative embodiments provide a method, apparatus, system, and computer program product for increasing the accuracy in positioning composite plies. In one illustrative example, a composite ply is processed. In processing the composite ply, an image of the composite ply is received. Natural features in the image of the composite ply are detected. Feature data for the natural features detected are saved in association with a ply identifier for the composite ply in a repository, wherein the feature data is used to position the composite ply during manufacturing of the composite part using the composite ply. These natural features can be fiducial markers for positioning the composite ply.

With reference to the figures in particular with reference to FIG. 1, an illustration of a block diagram of composite part manufacturing environment is depicted in accordance with an illustrative embodiment. Composite part manufacturing environment 100 includes composite manufacturing system 102, which can operate to manufacture composite part 104 for platform 106.

In this illustrative example, platform 106 can take a number of different forms. For example, platform 106 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building, other suitable types of platforms.

Composite part 104 for platform 106 can also take a number of different forms. For example, composite part 104 can be selected from at least one of a skin panel, a stringer, a wing, a wing box, a nacelle, a fuselage section, a door, a panel, a control surface, a vertical stabilizer, a horizontal stabilizer, a rudder, an elevator, an aileron, a vehicle hood, a wall panel, a pipe, a composite sandwich panel, and other suitable types of composite parts for use in platform 106.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, composite manufacturing system 102 comprises a number of different components. As depicted, composite manufacturing system 102 includes fabrication equipment 108, computer system 110, and fabrication controller 112.

Fabrication controller 112 can be implemented in software, hardware, firmware or a combination thereof. When software is used, the operations performed by fabrication controller 112 can be implemented in program instructions configured to run on hardware, such as a processor unit. When firmware is used, the operations performed by fabrication controller 112 can be implemented in program instructions and data and stored in persistent memory to run on a processor unit. When hardware is employed, the hardware can include circuits that operate to perform the operations in fabrication controller 112.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations.

Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 110 is a physical hardware system and includes one or more data processing systems. When more than one data processing system is present in computer system 110, those data processing systems are in communication with each other using a communications medium. The communications medium can be a network. The data processing systems can be selected from at least one of a computer, a server computer, a tablet computer, or some other suitable data processing system.

Fabrication equipment 108 is physical equipment and can include physical machines or devices that can be used to perform operations in manufacturing composite part 104. In this illustrative example, fabrication equipment 108 can include automated manufacturing equipment 114. Automated manufacturing equipment 114 is a hardware system and can include software. Automated manufacturing equipment can perform tasks without needing input or instructions from a human operator. Automated manufacturing equipment 114 can include circuits such as a processor unit, an application specific integrated circuit (ASIC), or other hardware that is configured or designed to enable performance of the tasks. This hardware can be programmable and can be, for example, a computer numeric control (CNC) machine.

For example, automated manufacturing equipment 114 can be a physical machine that cuts composite ply 116 to have shape 118. In this illustrative example, composite ply 116 is a composite material comprising fibers and resins that have not been finally cured or consolidated to form composite part 104. For example, automated manufacturing equipment 114 can be a cutting machine that employs a cutter such as an electric oscillating knife, an ultrasonic knife, a laser cutter, a kit cutting machine, a drag knife, a driven rotary blade, or other suitable type of machine that can be automated to cut composite ply 116.

As another example, automated manufacturing equipment 114 can still be an automated fiber placement (AFP) machine such as a pick and place robot that operates to move or position composite ply 116. In yet another example, automated manufacturing equipment 114 can be a multi-function machine.

In this illustrative example, composite ply 116 can be comprised of fibers in which resin can be infused and cured to form composite part 104. In the illustrative examples, composite ply 116 can already have resin infused such that composite ply 116 can be a layer of prepreg.

These fibers can be, for example, a carbon fiber. The fibers can also be used in addition to or in place of the carbon fiber, such as fiberglass fibers, para-aramid fibers, aramid fibers, or other suitable fibers that can be used to form composite ply 116. In an illustrative example, many layers of composite ply 116 can be laid out in different orientations and cured in different shapes to form composite part 104. Composite ply 116 can be laid up by itself or with other plies to form a face sheet with a core material between the two face sheets to form a composite sandwich for composite part 104.

In the illustration of example, fabrication equipment 108 can also include a charge layup system, a conveyor, an autoclave, an oven, a lathe, a paint application system, or other suitable pieces of equipment that can be operated to manufacture composite part 104. These other types of fabrication equipment 108 may or may not be automated.

As depicted, fabrication controller 112 is located in computer system 110. Fabrication controller 112 can be implemented in software, hardware, firmware, or a combination thereof. When software is used, the operations performed by fabrication controller 112 can be implemented in program code configured to run on hardware, such as a processor unit. When firmware is used, the operations performed by fabrication controller 112 can be implemented in program code and data and stored in persistent memory to run on a processor unit. When hardware is employed, the hardware can include circuits that operate to perform the operations in fabrication controller 112.

As used herein, a "number of" when used with reference items means one or more items. For example, a number of operations is one or more operations.

Computer system 110 can be configured to perform at least one of the steps, operations, or actions described in the different illustrative examples using software, hardware, firmware, or a combination thereof.

In this illustrative example, program 137 can be example of an implementation for fabrication controller 112 when fabrication controller 112 takes the form of software.

In this illustrative example, fabrication controller 112 can perform one or more of the different operations illustrated in the flowcharts in FIGS. 6-17.

As depicted, fabrication controller 112 can control fabrication equipment 108 to cut composite ply 116 to have shape 118 defined by ply shape model 123 for composite part 104 using automated manufacturing equipment 114. In this illustrative example, ply shape model 123 is information readable by fabrication controller 112. Ply shape model 123 can be, for example, a computer-aided design (CAD) model that defines shape 118 for composite ply 116.

Prior to or after cutting composite ply 116 to have shape 118, fabrication controller 112 generates image 120 of composite ply 116 in this illustrative example. As depicted, fabrication controller 112 can generate image 120 using sensor system 121. In this depicted example, sensor system 121 includes camera system 122, which generates image 120. Camera system 122 can be one or more cameras that can generate images.

As depicted, natural features 124 are located on composite ply 116 and are captured in image 120 generated by camera system 122. Fabrication controller 112 can perform preprocessing of image 120. This preprocessing can include performing at least one of rectifying or removing distortions in image 120 using camera calibration data for camera system 122 generating the image 120.

Fabrication controller 112 can detect natural features 124 in image 120 of composite ply 116. Natural features 124 are textures on the surface of composite ply 116. These textures are surface characteristics of composite ply 116 that are defined by the fibers in composite ply 116. These textures can also be defined by resin coating or infused in the fibers.

In this illustrative example, natural features 124 on composite ply 116 can be detected in region 126 in image 120. Region 126 can be selected to reduce matching errors. Region 126 is typically selected to be an area away from edges in the image 120. This region is an area in which image 120 is analyzed to identify natural features 124 located within region 126. In other words, natural features 124 can also be present outside of region 126. However, analysis of natural features 124 outside of region 126 may be increase matching errors.

In analyzing image 120, natural features 124 are detected within areas 128 in image 120. Fabrication controller 112 generates feature data 132 for natural features 124 using areas 128. Feature data 132 describes natural features 124 detected in areas 128 in image 120.

For example, feature data 132 can comprise at least one of vectors 127 describing a natural feature in natural features 124, ply identifier 145 for composite ply 116, reference location 129 for the composite ply 116, or image 120 of the composite ply 116, coordinates identifying positions of natural features 124 within image 120, or other information that can be used to position composite ply 116 to manufacture composite part 104.

In this illustrative example, a position comprises a location which can be described in two dimensional or three-dimensional coordinates. Additionally, position can also include an orientation.

In this illustrative example, each vector in vectors 127 is a numerical representation of a feature in natural features 124. In the illustrative example, this numerical representation can be generated as an output by the computer vision process 134 in detecting the natural feature.

Further, in this illustrative example, reference location 129 is a location on composite ply 116. Reference location 129 can be defined in ply shape model 123 for composite ply 116. Reference location 129 can be a central location or some other location in composite ply 116.

In this illustrative example, reference location 129 can be described with reference to natural features 124. This reference location can be selected as the location on composite ply 116 that is used to move placement device 148 towards or relative to composite ply 116. In this illustrative example, the reference location can be a vector using the same coordinate system as vectors 127.

For example, reference location 129 can be a location where end effector 149 should contact composite ply 116 to perform pick and place operation 139. In this example, natural features 124 are described using pixel locations using image coordinates. Reference location 129 can be converted to in robot or machine coordinates to move end effector 149. The identification of reference location 129 relative to natural features 124 can be indexing of composite ply 116. In other words, reference location 129 on composite ply 116 is known relative to the locations for natural features 124 on composite ply 116.

In the illustrative example, areas 128 are selected for analysis. Each area in areas 128 is analyzed to identify a natural feature. In the illustrative example, computer vision process 134 used by fabrication controller 112 selects areas 128 to analyze for natural features 124 in generating feature data 132.

Computer vision process 134 can take a number of different forms. For example, computer vision process 134 can be selected from a group comprising scale-invariant feature transform (SIFT), binary robust independent elementary features (BRIEF), oriented FAST and rotated BRIEF (ORB), accelerated KAZE (AKAZE), and speeded up robust features (SURF) and other processes that can detect objects such as natural features in images.

In the illustrative example, areas 128 can take the form of windows 130. Windows 130 can be selected by computer vision process 134 as part of detecting natural features.

Windows 130 can have different shapes. For example, windows 130 can be a rectangle, a square, a circle, or some other type of polygon. The shape of windows 130 can depend on the particular computer vision process used to analyze image 120. In other words, computer vision process 134 can select windows 130 as part of the process of detecting natural features 124 in image 120. Further, computer vision process 134 may detect a number of natural features 124 less than all of the natural features that can be detected within image 120. For example, computer vision process 134 may select 4, 17, 100, 550, or some other number of features for natural features 124 even though 1000 natural features are present within region 126 of image 120.

In this illustrative example, fabrication controller 112 saves feature data 132 for natural features 124 detected in association with ply identifier 145 for composite ply 116 in repository 143. Ply identifier 145 can be part of feature data 132 as an index for feature data 132. Repository 143 can take a number of different forms. For example, repository 143 can be a database, a container system, or some other suitable storage space where data can be stored.

In this illustrative example, feature data 132 can be used to position composite ply 116 during manufacturing of composite part 104 using the composite ply 116. As depicted, fabrication controller 112 can perform a set of manufacturing operations 133 using feature data 132 for natural features 124 in image 120 of composite ply 116. As used herein, a "set of" used with reference to items means one or more items. For example, a set of manufacturing operations 133 is one or more of manufacturing operations 133.

As depicted, fabrication controller 112 performs the set of manufacturing operations 133 by sending instructions 160 to fabrication equipment 108 in in which instructions 160 are executable by fabrication equipment 108 to cause fabrication equipment 108 to perform manufacturing operations 133 with composite ply 116.

In this illustrative example, instructions 160 can be program code, commands, electrical signals, or other types of instructions that can be used by fabrication equipment to perform manufacturing operations 133. In the depicted example, manufacturing operations 133 includes pick and place operation 139.

In this illustrative example, image 120 can be first image 136 and feature data 132 can be first feature data 138. As depicted, first image 136 is generated by first camera 142 in camera system 122.

In this example, second image 140 is of composite ply 116 generated by camera system 122. In this illustrative example, first image 136 is generated by first camera 142 in camera system 122 for current position of composite ply 116.

In this example, second image 140 of composite ply 116 is generated for placement device 148 by second camera 144 in camera system 122. Second image 140 is for device position 146 of placement device 148. In this illustrative example, second camera 144 can be located in end effector 149 of placement device 148. Placement device 148 can take a number of different forms. For example, placement device 148 can be one of a robotic arm, a pick and place tool, and other suitable devices that are capable of moving composite ply 116.

As depicted, first camera 142 and second camera 144 can be in different positions in composite part manufacturing environment 100. For example, first camera 142 can be for current position 135 where composite ply 116 is located when first image 136 was generated. Second camera 144 can be in another position such as device position 146 of placement device 148.

In this illustrative example, fabrication controller 112 detects natural features 124 in second image 140. Fabrication controller 112 can generate second feature data 150 for natural features 124 in second image 140.

Fabrication controller 112 determines offset 141 between the first feature data 138 for natural features 124 in first image 136 of composite ply 116 at current position 135 and second feature data 150 for natural features 124 in second image 140 of composite ply 116 at device position 146 of placement device 148. In this example, placement device 148 is automated manufacturing equipment 114 that is capable of positioning composite ply 116 into different positions. This positioning can include at least one of picking up or moving composite ply 116.

In this illustrative example, fabrication controller 112 can move placement device 148 from device position 146 to current position 135 using offset 141. For example, placement device 148 can be a robotic arm having end effector 149. Further, the robotic arm can be fixed to a base. In this example, the robotic arm can move to current position 135 by moving end effector 149 to current position 135.

With this example implementation, end effector 149 can be moved by fabrication controller 112 by sending instructions 160 to placement device 148 until the set of natural features 124 are in a selected position within the field of view of the second camera 144 in sensor system 121. In other words, additional images can be generated, and additional instructions can be generated based on the additional images. These additional instructions can be sent to placement device 148 to cause movement of placement device 148 until placement device 148 is in current position 135 within a desired level of tolerance.

When placement device 148 is in current position 135 for composite ply 116, fabrication controller 112 can generate instructions 160 to cause placement device 148 to pick up and move composite ply 116. This movement of composite ply 116 can take a number of different forms within composite part manufacturing environment 100.

For example, fabrication controller 112 can generate instructions 160 executable by placement device 148 to move composite ply 116 from current position 135 to desired position 161. These instructions can be executed to perform one of a pick operation that picks up composite ply 116 from current position 135 and places composite ply 116 in the desired position 161; a pick and place operation that picks up composite ply 116 from current position and places the composite ply 116 in desired position 161; a placement of composite ply 116 in desired position 161 on another composite ply as part of forming a composite charge; and a placement of composite ply 116 on a layup tool.

In identifying positions for composite ply 116, natural features 124 can be centered within an image in sensor data 162 generated by second camera 144 in sensor system 121 for placement device 148 to be in the correct position to move composite ply 116. When natural features 124 are in the correct location within the image, then the coordinates of the natural features 124 can be determined with respect to a camera coordinate system for second camera 144.

A transform can be used to transform the coordinates in the camera coordinate system into coordinates for a base coordinate system of the base of placement device 148. Another transform can be used to transform the coordinates from the base coordinate system into coordinates for the end effector coordinate system.

In yet another illustrative example, a camera in camera system 122 can be located in another location other than in end effector 149. In this example, the camera can be located such that the camera can generate images of end effector 149, natural features 124, and a desired position such as a location on a layup tool. In this example, an image can be of composite ply 116 in a position in the camera coordinate system. A transform can used to transform the coordinates into the coordinate system for end effector 149.

In this manner, composite ply 116 in a line from end effector 149 to composite ply 116 can be moved to pick up composite ply 116 from current position 135. This line is also referred to an end effector line. A similar process can be used to move composite ply 116 from current position 135 to a desired position, such as on layup tool or on another composite ply.

Thus, the process performed using fabrication controller 112 in this example generates an image to determine natural features for having a known relative position. For example, when a composite ply is picked, the placement device may be configured to pick up the composite ply such that the center of the composite ply is at the center of the placement device, such as an end effector on a pick and place robot. These relative positions can be determined using the different images generated and analyze by fabrication controller 112.

In other words, the reference position can be determined on the composite ply that is based on the natural features on the composite ply. When the composite ply is picked up by placement device, the placement device can determine the same reference position from determining the natural features on the composite ply in the second image generated for positioning.

In one illustrative example, one or more technical solutions are present that overcome a technical problem with moving composite plies with for desired location and orientation of the composite plies within specified tolerances. As a result, one or more technical solutions can provide a technical effect increasing the accuracy in moving composite plies when composite plies are handled in multiple steps.

In one or more illustrative examples, an image of a composite ply is generated prior to indexing the composite ply within an area or location where operations are performed using composite ply. This indexing can determine the position of the composite ply in a location where operations are to be performed using the composite ply. This position can be determined to dimensions are two dimensions or three dimensions. Additionally, position can also include the orientation of the composite ply.

The image is analyzed to determine natural features. The patterns of the natural features are inherent to the composite ply and are used as fiducial markers. When the composite ply is to be moved, another image can be generated and used to accurately position a placement device such as a robotic arm with an end effector.

The use of natural features as fiducial markers reduces errors from current indexing techniques such as indexing a cutter belt to move the composite ply to a pick position. Further, potential performance issues with using ink or other types of markers on composite plies can be avoided using natural features as the markers.

The illustration of composite part manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, fabrication controller 112 is shown as being a separate block in computer system 110 that is separate from fabrication equipment 108. In other illustrative examples, fabrication controller 112 can be located in fabrication equipment 108. In yet other illustrative examples, fabrication controller 112 can be a distributed process in which the processes can be located in individual pieces of automated manufacturing equipment 114 that can access repository 143.

Figure 2:
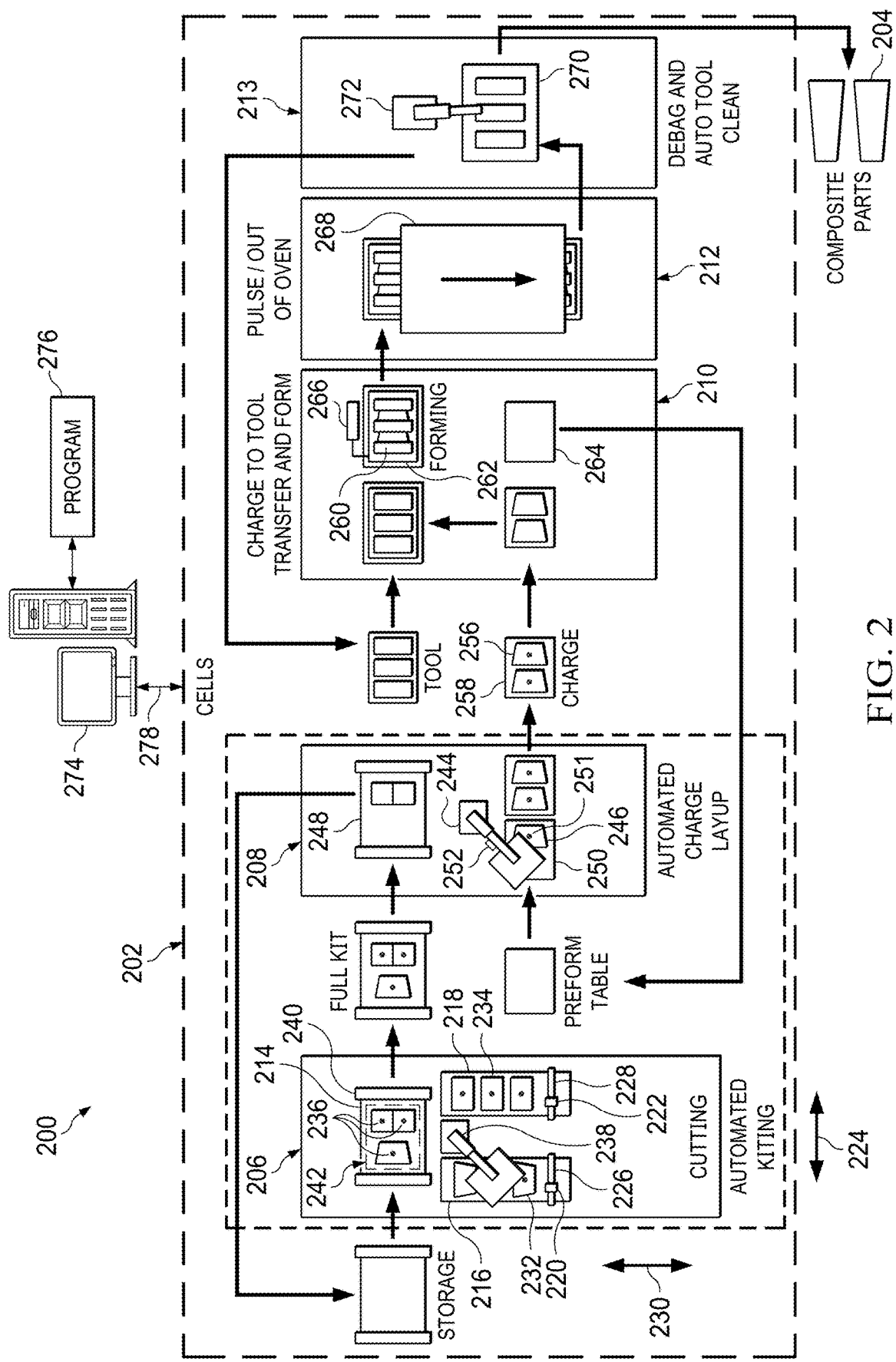
FIG. 2 is an illustration of a composite manufacturing system in accordance with an illustrative embodiment.

With reference now to FIG. 2, an illustration of a composite manufacturing system is depicted in accordance with an illustrative embodiment. Composite manufacturing system 200 is an example implementation for composite manufacturing system 102 illustrated in FIG. 1.

As depicted, composite manufacturing system 200 comprises cells 202 that operate to fabricate composite parts 204. In this illustrative example, composite parts 204 can take a number of different forms. For example, composite parts 204 can be selected from at least one of a skin panel, a stringer, a door, a nacelle, or other suitable type of composite part. As depicted, different types of cells 202 are present in composite manufacturing system 200. These cells can be, for example, cutting and knitting cell 206, automated charge layup cell 208, charge to tool transfer and forming cell 210, curing cell 212, and cleaning cell 213.

As depicted, cutting and knitting cell 206 is a cell in composite manufacturing system 200 that operates to create composite plies 214 for use in manufacturing composite parts 204. In this illustrative example, cutting and knitting cell 206 automatically performs cutting operations using automated cutting machine 216 and automated cutting machine 218. As depicted, automated cutting machine 216 and automated cutting machine 218 can be cutting beds, automated flatbed cutting systems, conveyor cutting beds, or other suitable types of automated cutting machines. In the illustrative example, each of these cutting machines can have a camera. The cutting machines can be, for example, computer numerical control (CNC) machines.

In this illustrative example, automated cutting machine 216 has cutting tool 220, and automated cutting machine 218 has cutting tool 222. In this illustrative example, cutting tool 220 and cutting tool 222 can take a number of different forms. For example, the cutter can be an electric oscillating knife, a drag knife, ultrasonic knife, a laser cutter, or some other suitable type of device that can cut composite materials to form composite plies 214 with a shape for manufacturing composite parts 204. As depicted, natural features 236 are present on composite plies 214 can be used to move composite plies 214 with a desired level of precision.

As depicted, cutting tool 220 can move in the direction of arrow 224 along gantry 226. Cutting tool 222 can also move in the direction of arrow 224 on gantry 228. Additionally, gantry 226 can move in the direction of arrow 230 on flatbed 232 of automated cutting machine 216. In similar fashion, gantry 228 can move in the direction of arrow 230 on flatbed 234 of automated cutting machine 218. In this illustrative example, flatbed 232 and flatbed 234 can be beds or platforms with moving conveyor belts.

As depicted, pick and place robot 238 can move composite plies 214 cut into desired shapes by automated cutting machine 216 and automated cutting machine 218 to storage 240 to form kit 242. As depicted, natural features 236 are present on composite plies 214 and are used to move composite plies 214. These natural features can be detected and used to move composite plies 214 into desired positions such as on storage 240.

In this illustrative example, pick and place robot 238 can detect natural features 236 on composite plies 214 when picking up composite plies 214 from flatbed 232 and flatbed 234 and placing composite plies 214 onto storage 240. Pick and place robot 238 can include the camera system (not shown) to detect natural features 236 on composite plies 214.

As depicted, kit 242 contains the composite plies 214 with shapes needed to form a composite part in composite parts 204. In this illustrative example, storage 240 can be a cart or other mobile platform that can be moved automatically or by a human operator. Storage 240 enables moving composite plies 214 to other cells for additional processing to manufacture composite parts 204.

As depicted, storage 240 can move composite plies 214 to charge layup cell 208 for further processing. In this illustrative example, pick and place robot 244 picks up composite ply 246 from storage 248 and places composite ply 246 onto preform table 250. In this illustrative example, pick and place robot 244 includes camera 252 that detects natural features 251 on composite ply 246 for use in picking up composite ply 246 from storage 248 and placing composite ply 246 onto preform table 250.

With the use of natural features 251, composite ply 246 can be placed on preform table 250 with a desired level of tolerance. In this illustrative example, preform table 250 is a carrier for composite plies and can take the form of a grid that is composed of metallic strips bonded in a grid fashion.

Although pick and place robot 238 can also move composite plies 214 with a desired level tolerance using natural features 236, that type of placement can be optional with the use of pick and place robot 244 in charge layup cell 208. In other words, the use of natural features 251 to place composite ply 246 onto preform table 250 can be used to reduce or eliminate the effect of other positional errors occurring from other movement of composite ply 246 on flatbed 232, on storage 248 by pick and place robot 238, and other movement of these composite plies.

In this illustrative example, charge layup cell 208 is an example of a cell in which errors from prior movement of composite plies can be reduced or eliminated. In this depicted example, errors can be reduced or eliminated when placing composite ply 246 onto preform table 250 using natural features 251.

The layup of composite plies can be performed to form a charge, such as charge 256 on preform table 258. Preform table 258 can be moved to charge to tool transfer and forming cell 210.

As depicted, charge 260 has been moved onto tool 262 from preform table 264. In this illustrative example, a resin can be infused into charge 260 from resin reservoir 266. The addition of resin can be optional when a prepreg is used.

Tool 262 with charge 260 infused with resin can be moved into autoclave 268 in curing cell 212. Thereafter, composite parts 204 can be removed from tool 270 by robotic arm 272 in cleaning cell 213. In this cell, operations such as the bagging and tool cleaning of tool 270 can be performed such that tool 270 can be cleaned for further use.

In this illustrative example, computer 274 can run program 276 to control the different cells in composite manufacturing system 200 to automatically perform operations to manufacture composite parts 204. As depicted, computer 274 can communicate with computers or other control devices for (not shown) the manufacturing equipment in cells 202 using communications link 278. Communications link 278 can be at least one of a physical connection or a wireless connection.

Thus, the illustrative examples, natural features 236 can be detected on composite plies 214 prior to composite plies 214 being indexed in cutting and knitting cell 206 for movement by a pick and place robot, such as pick and place robot 238 and pick and place robot 244. From the time that natural features 236 are detected on composite plies 214, subsequent movement of composite plies 214 can be performed using a camera on the pick and place robot to resolve the position of composite plies 214 with respect to an end effector on the pick and place robot. In this manner, the positioning of the end effector with respect to natural features 236 can be determined with a desired level of accuracy using natural features 236.

Subsequent operations moving composite plies 214 do not introduce additional error as the relative position of composite plies 214 can be determined before each operation moving composite plies 214.

Figure 3:
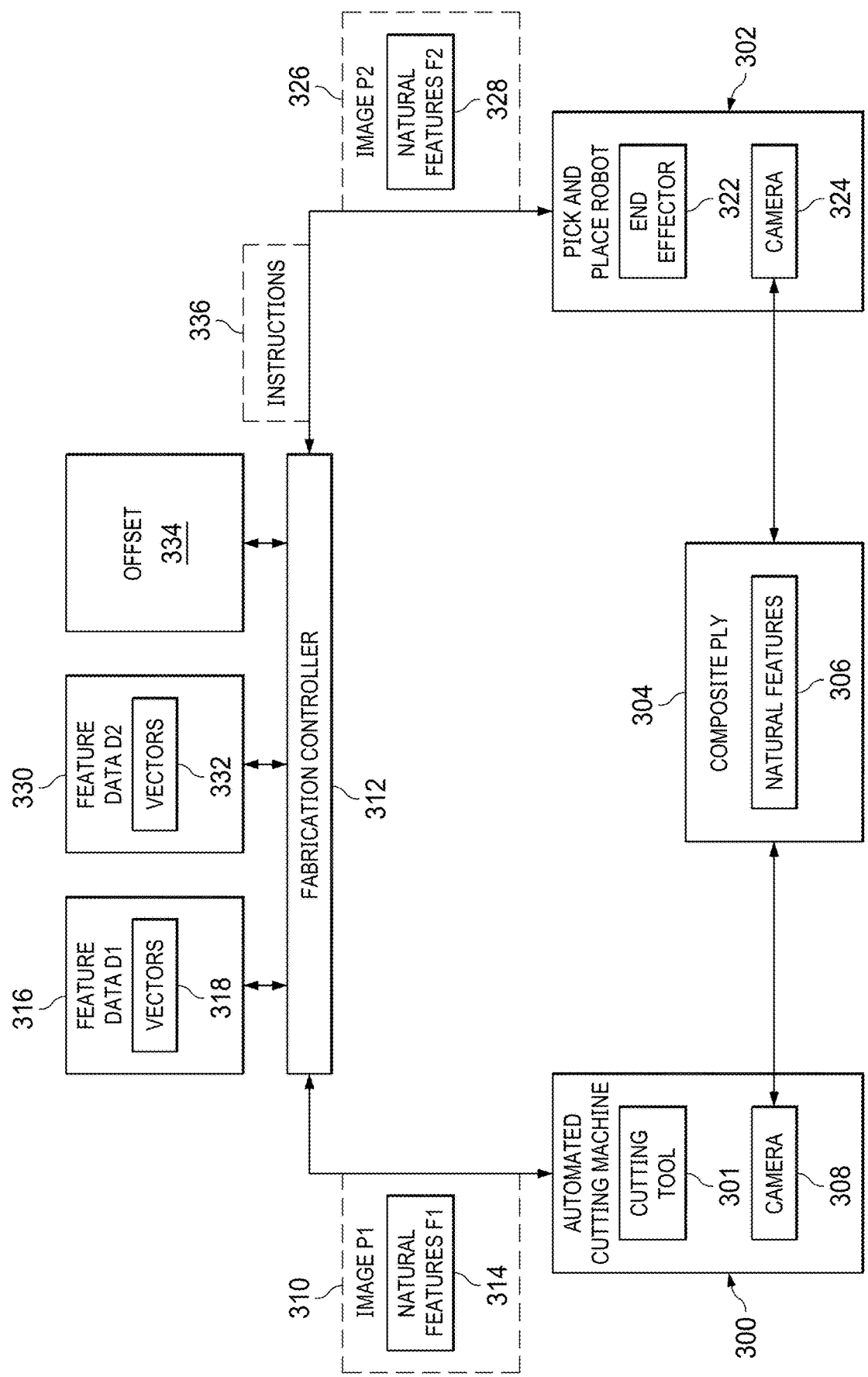
FIG. 3 is an illustration of dataflow diagram for moving a placing device in accordance with an illustrative embodiment.

With reference now to FIG. 3, an illustration of dataflow diagram for moving a placing device is depicted in accordance with an illustrative embodiment. The data flow in this illustrative example, can be performed for images generated by automated cutting machine 300 having cutting tool 301 and by pick and place robot 302. In this example, automated cutting machine 216 with cutting tool 220 is example of automated cutting machine 300 with cutting tool 301. Pick and place robot 238 is an example of pick and place robot 302.

As depicted, composite ply 304 with natural features 306 can be moved by pick and place robot 302 after being cut by cutting tool 301 on automated cutting machine 300. In this example, camera 308 is located with cutting tool 301 on automated cutting machine 300. This camera generates image P1 310 of natural features 306 on composite ply 304. Image P1 310 is sent to fabrication controller 312. Fabrication controller 312 is an example of fabrication controller 112 in FIG. 1.

In response to receiving image P1 310, fabrication controller 312, determines natural features F1 314 located in image P1 310 of composite ply 304. In other words, natural features F1 314 are representations of natural features 306 on composite ply 304 using pixels. These pixel representations of natural features 306 can be recognized by fabrication controller 312 using computer vision process 320.

Feature data D1 316 is generated by fabrication controller 312 from the determination of natural features F1 314 in image P1 310. In this depicted example, feature data D1 316 can represent natural features F1 314 in image P1 310 using vectors 318 that describes the natural features F1 314 determined to be present in image P1 310. Each vector can describe a natural feature in a natural features F1 314 in image P1 310.

In this illustrative example, pick and place robot 302 has end effector 322 with camera 324 located at or near end effector 322. Camera 324 generates image P2 326 of composite ply 304 with natural features 306. Image P2 326 is sent to fabrication controller 312. In response to receiving this image, fabrication controller 312 analyzes image P2 326 to determine natural features F2 328 in image P2 326. These natural features are representations of natural features 306 using pixels.

Fabrication controller 312 generates feature data D2 330 from the determination of natural features F2 328 found in image P2 326. Feature data D2 330 also takes the form vectors 332 representing natural features F2 328 determined from image P2 326.

In this example, the nearest neighbors between natural features F1 314 and natural features F2 328 can be determined using the feature data generated for each of these sets of natural features determined from the images. In other words, comparisons of vectors 318 in feature data D1 316 and vectors 332 in feature data D2 330 can be made to determine which ones of natural features F1 314 and natural features F2 328 are matches to each other. For example, fabrication controller 312 identifies natural features F1 314 and natural features F2 328 that are close enough to be considered matches. A threshold such as a Lowe's ratio test can be used.

These matches between natural features F1 314 in image P1 310 and natural features F2 328 in image P2 326 are used to determine positioning. The matches between natural features F1 314 and natural features F2 328 can be a subset of natural features 306 on composite ply 304. In other words, not all of natural features 306 in image P1 310 may be present in image P2 326. As result, a subset of natural features 306 can be present in determining natural features F1 314 from image P1 310 and natural features F2 328 from image P2 326.

The location of the natural features within these images can be determined in a number of different ways. For example, a reference point such as a center or origin by composite ply 304 can be used to measure the angles of the ply represented using pixels. In this manner, the location of natural features can be determined and compared between different images taken of composite ply 304.

Fabrication controller 312 can use the pixel positions of the matching natural features between natural features F1 314 and natural features F2 328 to determine offset 334 between these natural features. This offset can then be used generate instructions 336 that are sent to pick and place robot 302. Instructions 336 can be executed by pick and place robot 302 to move end effector 322 on pick and place robot 302 to pick up composite ply 304 with a desired level of accuracy.

In moving end effector 322 on pick and place robot 302, additional images can be taken and feature data from these images can be compared with feature data D1 316 to determine when end effector 322 on pick and place robot 302 is positioned within a desired level of accuracy to pick up composite ply 304. This process can take into account positioning errors that may occur with the movement of end effector 322 for pick and place robot 302.

The illustration of dataflow in FIG. 3 is presented as one manner in which dataflow can occur and not meant to limit other examples. For example, image P1 310 can be generated at the different devices other than automated cutting machine 300. In another illustrative example, image P1 310 can be generated by pick and place robot, a mobile cart, or some other suitable piece of equipment. As another example, camera 308 can be located in another location other than at automated cutting machine 300.

Figure 4:
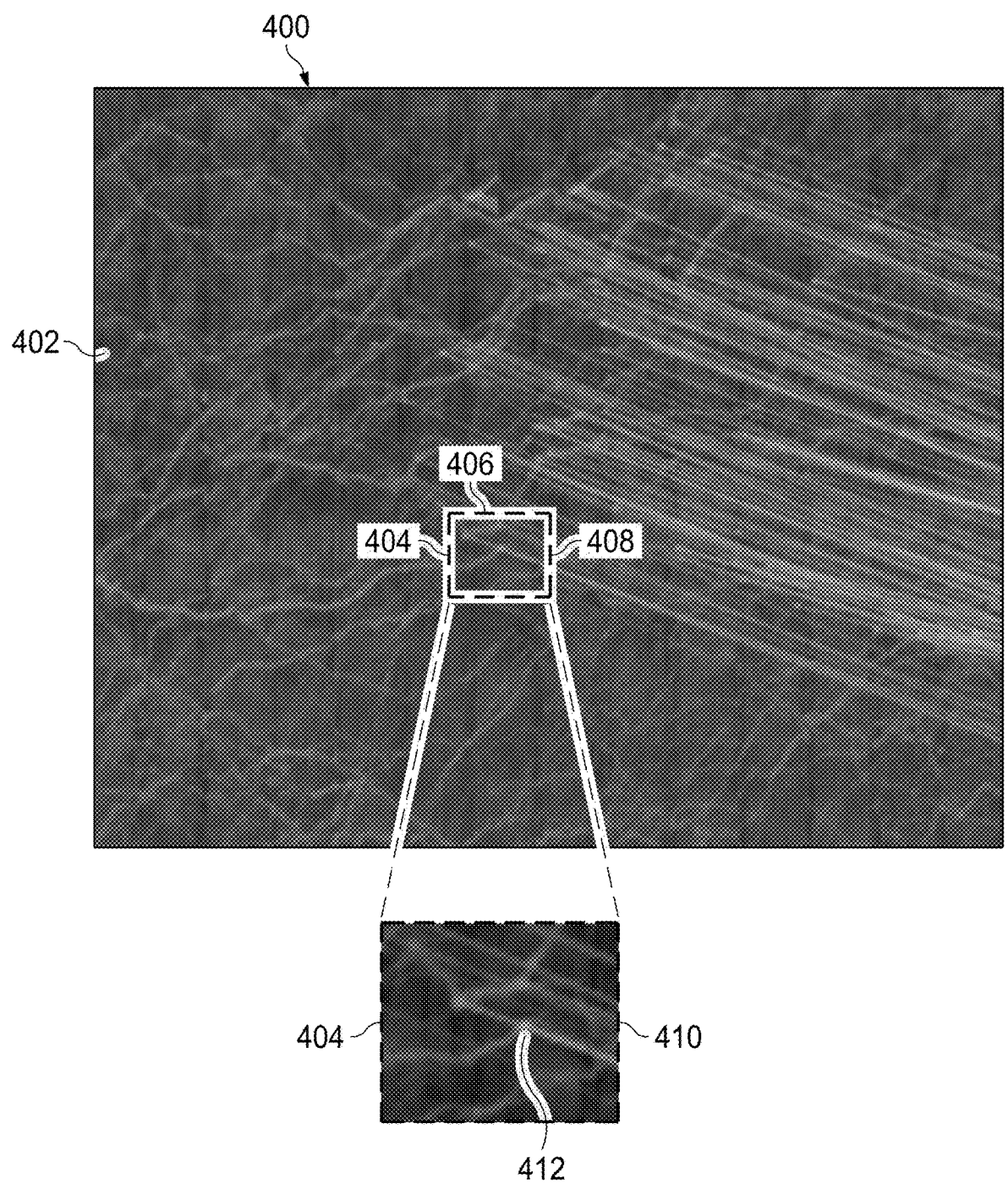
FIG. 4 is an illustration of a first image of a composite ply in accordance with an illustrative embodiment.
Figure 5:
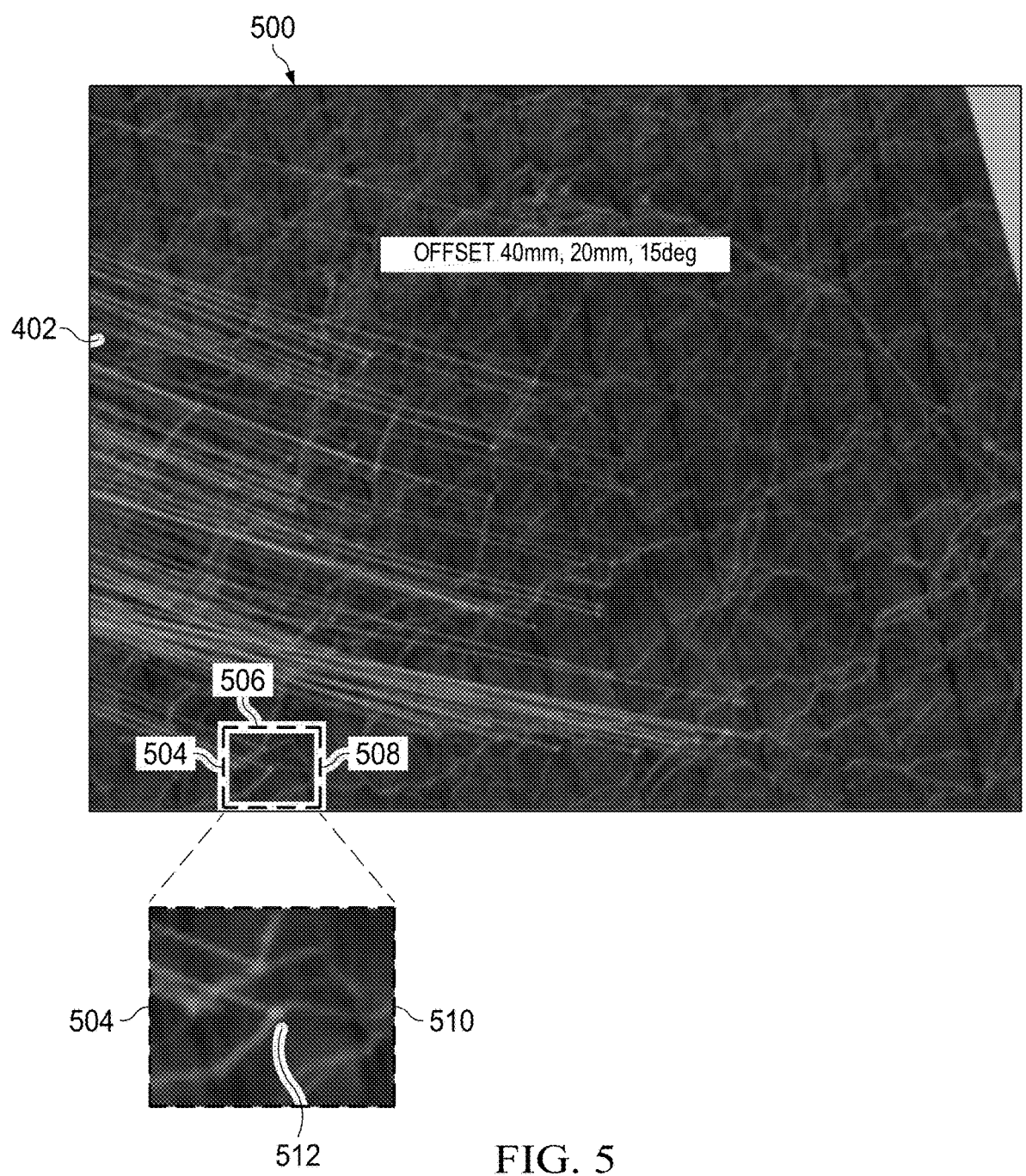
FIG. 5 is an illustration of a second image of the composite ply in accordance with an illustrative embodiment.

With reference now to FIGS. 4-5, images of natural features on a composite ply are depicted in accordance with an illustrative embodiment. With reference first to FIG. 4, an illustration of a first image of a composite ply is depicted in accordance with an illustrative embodiment. In this illustrative example, first image 400 is an image of composite ply 402 in which natural feature 404 has been identified. First image 400 can be an initial image, such as image P1 310 in FIG. 3 in the example data flow described above, image P1 310 is processed to identify initial natural features, such as natural features F1 314 for a particular composite ply, such as composite ply 304 in FIG. 3.

As depicted, natural feature 404 is a natural feature determined from first image 400 using a computer vision process. In this illustrative example, natural feature 404 is located in area 406. Area 406 is in the form of window 408 as determined by the computer vision process.

Section 410 is an enlarged view of window 408. As depicted in section 410, natural feature 404 is centered around pixel 412 in this example. The other pixels within section 410 and the appearance of a web that uniquely identifies natural feature 404 in section 410.

Turning now to FIG. 5, an illustration of a second image of the composite ply is depicted in accordance with an illustrative embodiment. Second image 500 is an image of composite ply 402. Second image is an example of an image P2 326 in FIG. 3 that can be generated for use in moving the placement device, such as pick and place robot 302 in FIG. 3. In this example, natural feature 504 is identified in area 506, which is in the form of window 508.

Section 510 is an enlarged view of window 508. As depicted, natural feature 504 is centered around pixel 512 in this example. A comparison of natural feature 404 in first image 400 with natural feature 504 in second image 500 indicates a match is present between the identified natural features in the two images. In other words, natural feature 404 identified in first image 400 and natural feature 504 identified in second image 500 are the same natural feature on composite ply 402. In this example, natural feature 504 is offset from natural feature 404 by 40 mm in the x direction and 20 mm in the y direction with a rotation of 15 degrees.

Illustration of first image 400 in FIG. 4 and second image 500 in FIG. 5 are presented as one illustration are not meant to limit other illustrative examples. As depicted, only a single natural feature is shown in these images to avoid obscuring an explanation of the natural features used in the different illustrative examples. In other illustrative examples, tens, hundreds, or thousands of natural features can be identified in images. Further, images have different sizes and can have a designated region that is processed to determine natural features.

Figure 6:
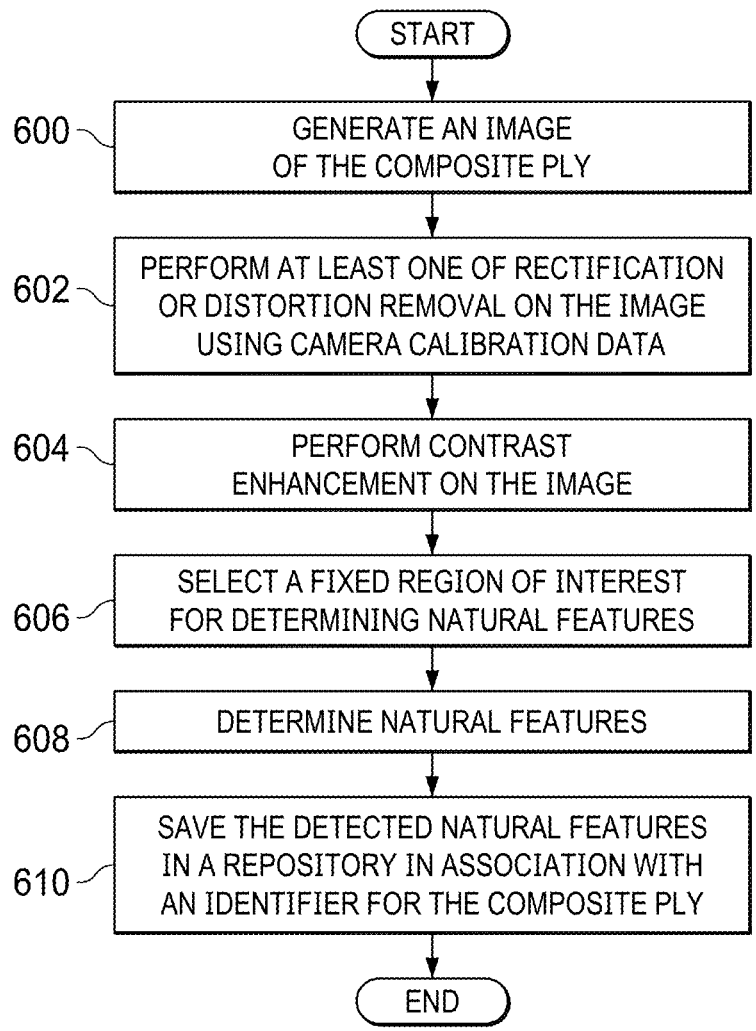
FIG. 6 is an illustration of a flowchart of a process for identifying natural features in accordance with an illustrative embodiment.

Turning next to FIG. 6, an illustration of a flowchart of a process for identifying natural features is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in fabrication controller 112 in computer system 110 in FIG. 1.

In this flowchart, the process generates an image to determine natural features for having a known relative position. In this example, the image can be generated and analyzed prior to moving the composite ply from a known position.

When a composite ply is picked, the placement device may be configured to pick up the composite ply such that the center of the composite ply is at the center of the placement device, such as an end effector on a pick and place robot. These relative positions can be determined using the various images.

The process begins by generating an image of the composite ply (operation 600). In operation 600, the image is generated by camera that can be on a device such as a cutter or in the area where the ply is to be referenced or indexed to the area of operations. This area of operation can be a cell or a number of cells in which manufacturing operations are performed using the composite ply.

The process performs at least one of rectification or distortion removal on the image using camera calibration data (operation 602). The process then performs contrast enhancement on the image (operation 604). This contrast enhancement can be performed to increase the ability to detect the natural features on the surface of the composite ply in the image. A contrast enhancement can be performed using various processes such as, for example, a contrast limited adaptive histogram equalization algorithm.

The process selects a fixed region of interest for determining natural features (operation 606). In operation 606, the selection of the region of interest can reduce issues with matching erroneous features on the edges of the image. In one illustrative example, the area that is central to the image can be selected for the region of interest.

The process determines natural features (operation 608). These natural features can be determined using computer vision processes that analyze images to identify objects such as natural features on the composite ply.

The process saves the detected natural features in a repository in association with an identifier for the composite ply (operation 610). The process terminates thereafter. In operation 610, the saving of the detected natural features can include converting the pixels in areas or windows in which natural features identified in two vectors that represent those natural features.

Figure 7:
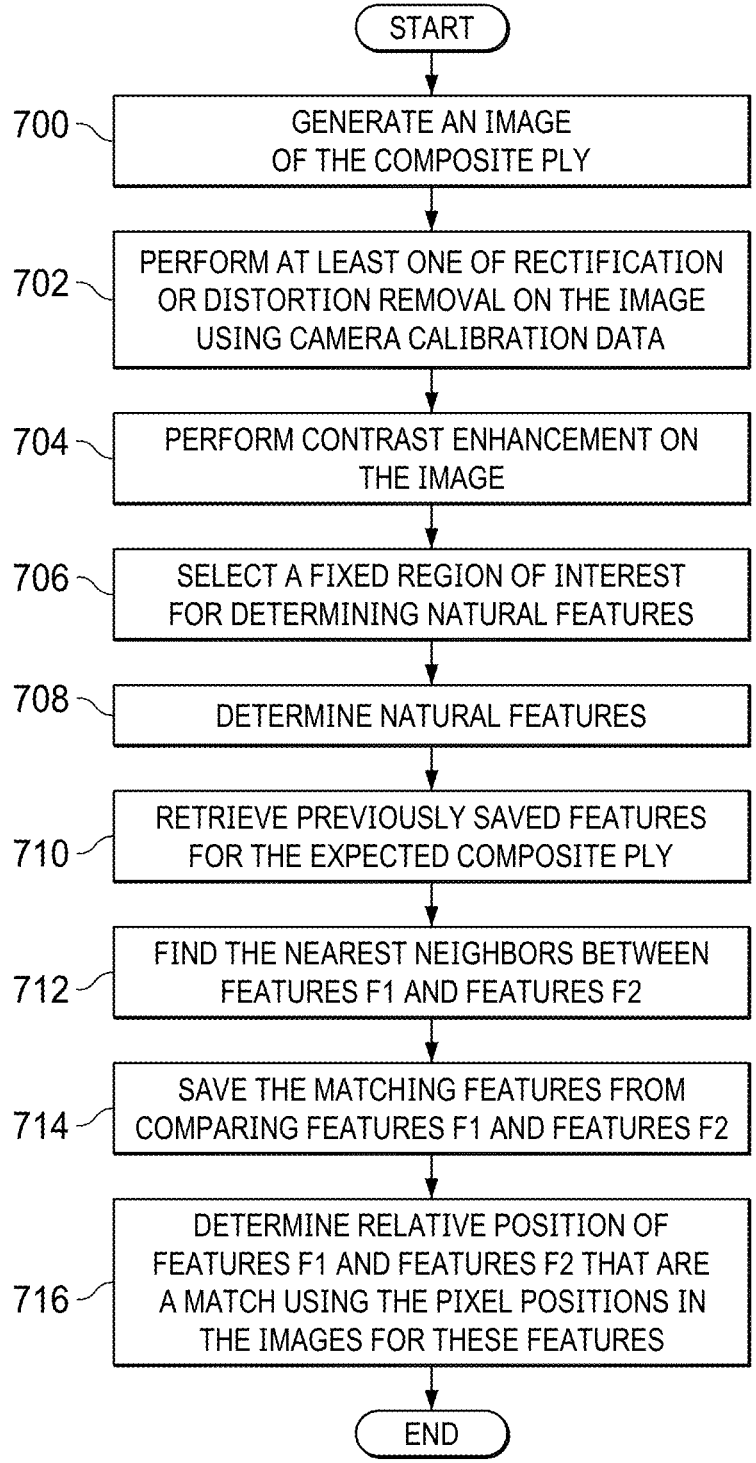
FIG. 7 is an illustration of a flowchart of a process for identifying natural features in accordance with an illustrative embodiment.

With reference now to FIG. 7, an illustration of a flowchart of a process for identifying natural features is depicted in accordance with an illustrative embodiment. The process in FIG. 7 can be implemented in hardware, software, or both. When implemented in software, the process can take the form of program instructions that are run by one or more processor units located in one or more hardware devices in one or more computer systems. For example, the process can be implemented in fabrication controller 112 in computer system 110 in FIG. 1.

In this flowchart, an image is generated of the composite ply for use in positioning a placement device. The process begins by generating an image of the composite ply (operation 700). The process performs at least one of rectification or distortion removal on the image using camera calibration data (operation 702). The process then performs contrast enhancement on the image (operation 704). The process selects a fixed region of interest for determining natural features (operation 706).

The process determines natural features (operation 708). In this example, the natural features are referred to as features F2. The natural features previously determined and saved are referred to as features F2.

The process retrieves previously saved features for the expected composite ply (operation 710). In operation 710, the previously saved features for the expected composite ply can be determined using a ply identifier as an index to the previously saved features.

The process finds the nearest neighbors between features F1 and features F2 (operation 712). The process saves the matching features from comparing features F1 and features F2 (operation 714). In operation 714, matching features can be features that are sufficiently close to each other using some threshold such as a Lowe's ratio test.

The process determines relative position of features F1 and features F2 that are a match using the pixel positions in the images for these features (operation 716). The process terminates thereafter. These pixel positions can be saved as part of the feature data saved for the determined natural features. In this illustrative example, the relative position is offset and can be represented as an 'affine' which is calculated in the plane x,y,alpha, or as a 'homography', which is a calculation of x,y,z, and roll,pitch,yaw.

With this offset information, instructions can be generated to move the placement device for which the image was generated to the composite ply. The placement device can be moved to a reference location on the composite ply. This reference location can also be saved as part of the feature data. The reference location can be selected, and locations of the features can be identified relative to that reference location.

Figure 8:
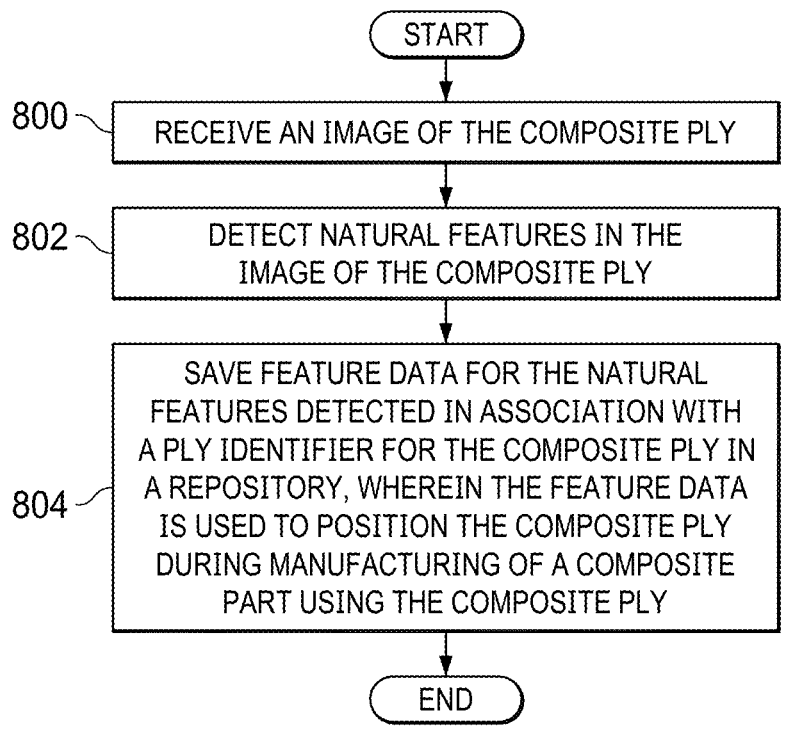
FIG. 8 is an illustration of a flowchart of a process for generating an image of a composite ply in accordance with an illustrative embodiment.

With reference now to FIG. 8, an illustration of a flowchart of a process for generating an image of a composite ply is depicted in accordance with an illustrative embodiment. The process in FIG. 8 can be implemented in hardware, software, or both. When implemented in software, the process can take the form of program instructions that are run by one or more processor units located in one or more hardware devices in one or more computer systems. For example, the process can be implemented in fabrication controller 112 in computer system 110 in FIG. 1.

The process begins by receiving an image of the composite ply (operation 800). The process detects natural features in the image of the composite ply (operation 802). The process saves feature data for the natural features detected in association with a ply identifier for the composite ply in a repository, wherein the feature data is used to position the composite ply during manufacturing of a composite part using the composite ply (operation 804). The process terminates thereafter.

Figure 9:
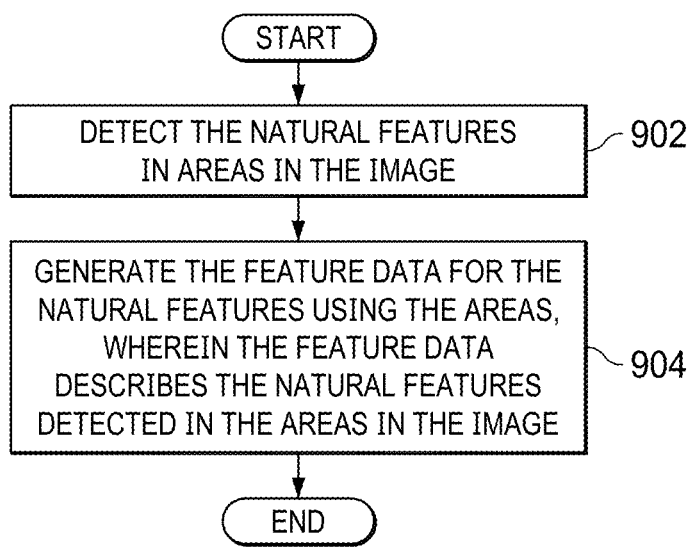
FIG. 9 is an illustration of a flowchart of a process for generating feature data for natural features using areas in an image in accordance with an illustrative embodiment.

Turning to FIG. 9, an illustration of a flowchart of a process for generating feature data for natural features using areas in an image is depicted in accordance with an illustrative embodiment. The operations in FIG. 9 are examples of additional operations that can be used with the operations in the process in FIG. 8.

The process begins by detecting the natural features in areas in the image (operation 900). The process generates the feature data for the natural features using the areas, wherein the feature data describes the natural features detected in the areas in the image (operation 902). The process terminates thereafter.

Figure 10:
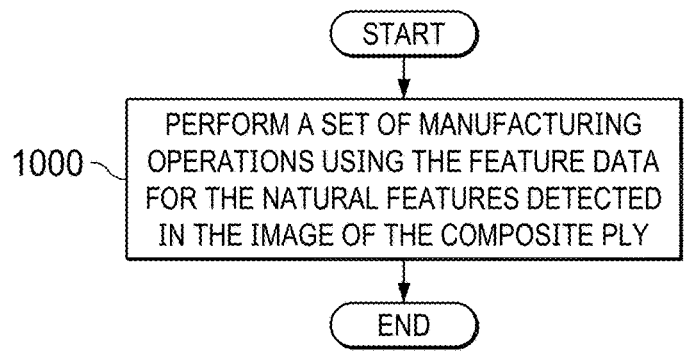
FIG. 10 is an illustration of a flowchart of a process for performing a set of manufacturing operations using feature data of an image in accordance with an illustrative embodiment.

Turning now to FIG. 10, an illustration of a flowchart of a process for performing a set of manufacturing operations using feature data of an image is depicted in accordance with an illustrative embodiment. The operation in FIG. 10 is an example of an additional operation that can be used with the operations in the process in FIG. 8.

The process performs a set of manufacturing operations using the feature data for the natural features detected in the image of the composite ply (operation 1000). The process terminates thereafter.

Figure 11:
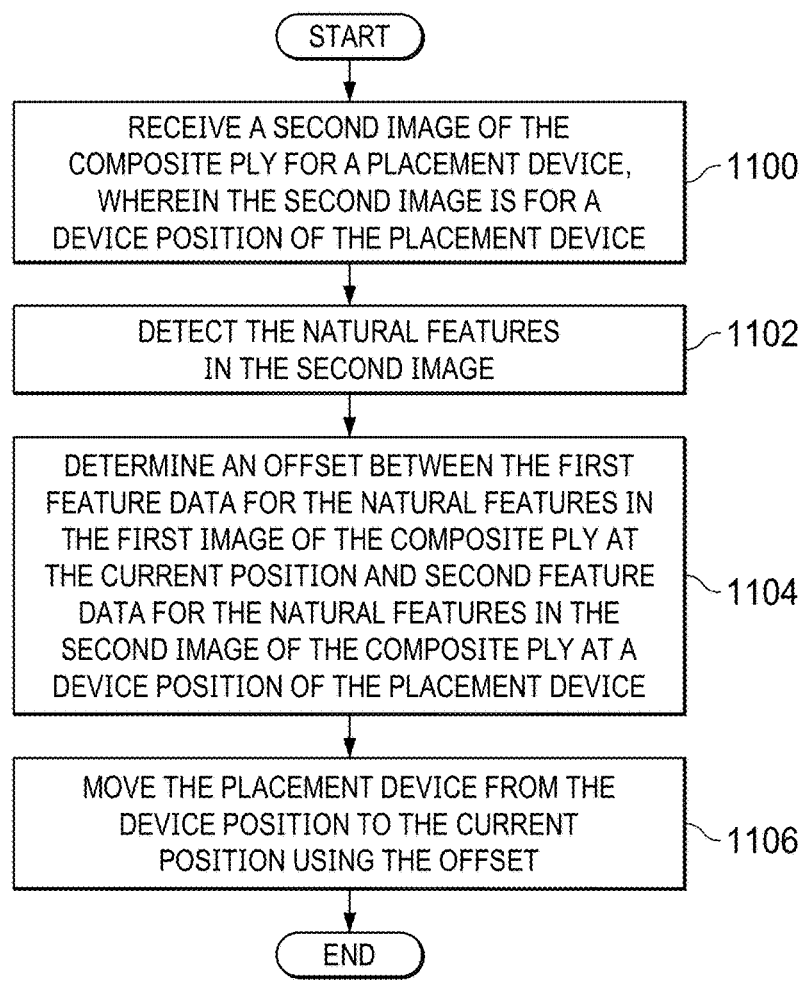
FIG. 11 is an illustration of a flowchart of a process for moving a placement device from a device position to a current position in accordance with an illustrative embodiment.

With reference to FIG. 11, an illustration of a flowchart of a process for moving a placement device from a device position to a current position is depicted in accordance with an illustrative embodiment. The operations in FIG. 11 are examples of additional operations that can be used with the operations in the process in FIG. 8.

The process begins by receiving a second image of the composite ply for a placement device, wherein the second image is for a device position of the placement device (operation 1100). The process detects the natural features in the second image (operation 1102). The process determines an offset between the first feature data for the natural features in the first image of the composite ply at the current position and second natural feature data for the natural features in the second image of the composite ply at a device position of the placement device (operation 1104). The process moves the placement device from the device position to the current position using the offset (operation 1106). The process terminates thereafter.

Figure 12:
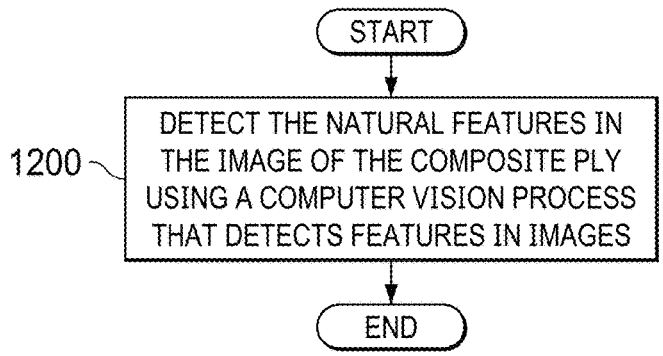
FIG. 12 is an illustration of a flowchart of a process for detecting natural features in an image in accordance with an illustrative embodiment.

Turning to FIG. 12, an illustration of a flowchart of a process for positioning a composite ply by a placement device using natural features is depicted in accordance with an illustrative embodiment. The process depicted in FIG. 12 is an example of an implementation of operation 802 in FIG. 8.

The process detects the natural features in the image of the composite ply using a computer vision process that detects features in images (operation 1200). The process terminates thereafter.

Figure 13:
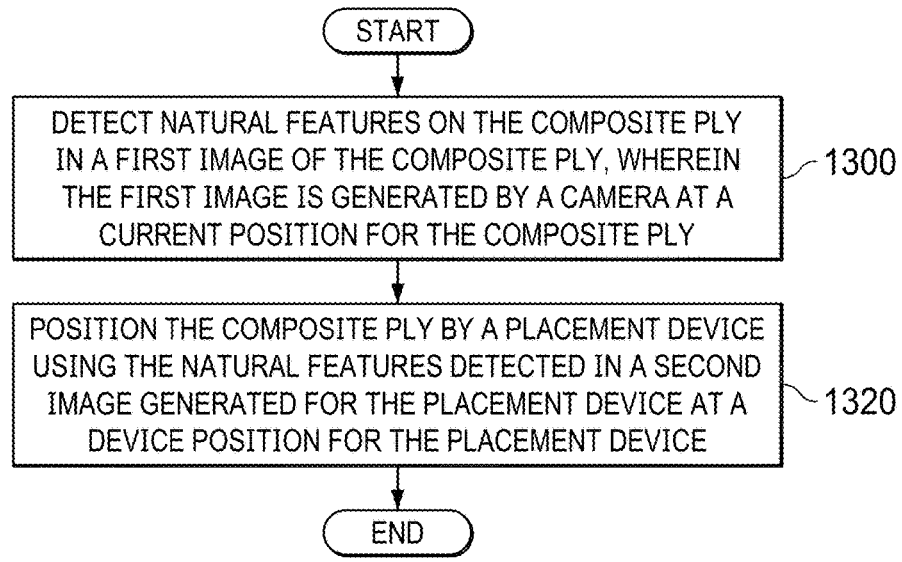
FIG. 13 is an illustration of a flowchart of a process for positioning a composite ply by a placement device using natural features in accordance with an illustrative embodiment.

With reference now to FIG. 13, an illustration of a flowchart of a process for positioning a composite ply by a placement device using natural features is depicted in accordance with an illustrative embodiment. The process in FIG.

13 can be implemented in hardware, software, or both. When implemented in software, the process can take the form of program instructions that are run by one of more processor units located in one or more hardware devices in one or more computer systems. For example, the process can be implemented in fabrication controller 112 in computer system 110 in FIG. 1.

The process begins by detecting natural features on the composite ply in a first image of the composite ply, wherein the first image is generated by a camera at a current position for the composite ply (operation 1300). The process positions the composite ply by a placement device using the natural features detected in a second image generated for the placement device at a device position for the placement device (operation 1302). The process terminates thereafter.

Figure 14:
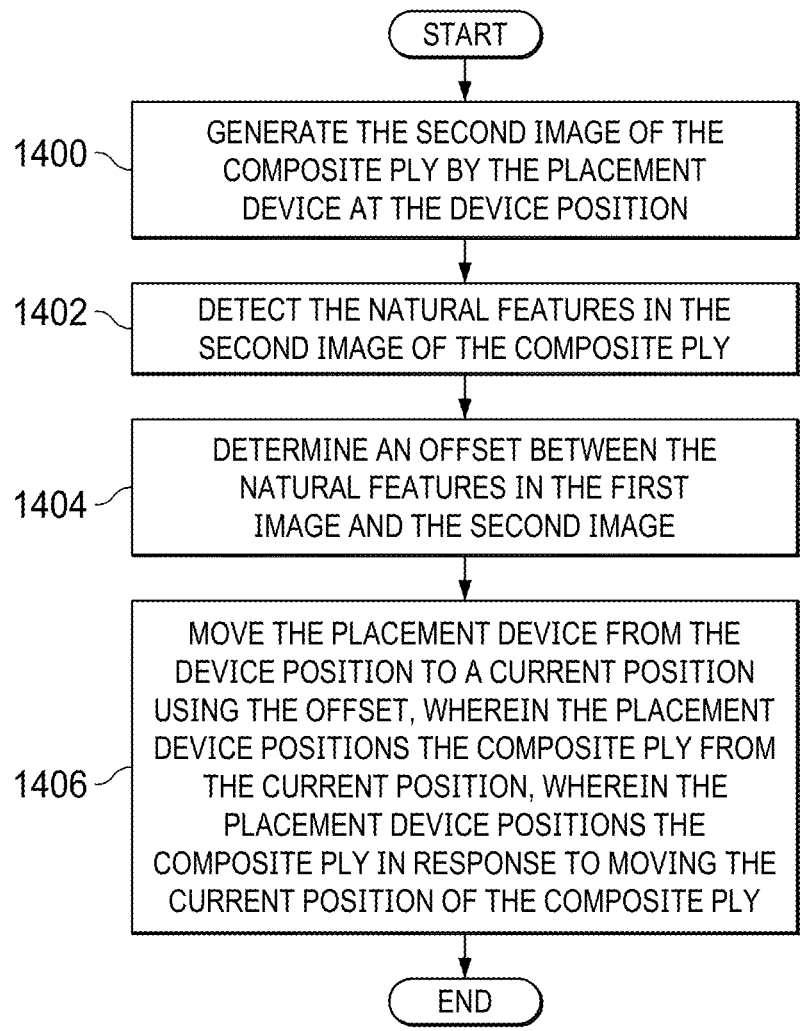
FIG. 14 is an illustration of a flowchart of a process for moving a placement device to a current position using an offset in accordance with an illustrative embodiment.

Turning to FIG. 14, an illustration of a flowchart of a process for moving a placement device to a current position using an offset is depicted in accordance with an illustrative embodiment. The operations in FIG. 14 are examples of additional operations that can be used with the operations in the process in FIG. 13.

The process begins by generating the second image of the composite ply by the placement device at the device position (operation 1400). The process detects the natural features in the second image of the composite ply (operation 1402). The process determines an offset between the natural features in the first image and the second image (operation 1404). The process moves the placement device from the device position to a current position using the offset, wherein the placement device positions the composite ply from the current position, wherein the placement device positions the composite ply in response to moving the current position of the composite ply (operation 1406). The process terminates thereafter.

Figure 15:
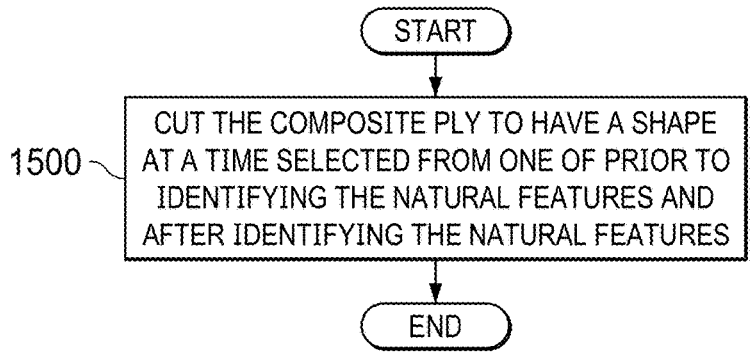
FIG. 15 is an illustration of a flowchart of a process for cutting a composite ply in accordance with an illustrative embodiment.

With reference to FIG. 15, an illustration of a flowchart of a process for cutting a composite ply is depicted in accordance with an illustrative embodiment. The operation in FIG. 15 is an example of an additional operation that can be used with the operations in the process in FIG. 13.

The process cuts the composite ply to have a shape at a time selected from one of prior to identifying the natural features and after identifying the natural features (operation 1500). The process terminates thereafter.

Figure 16:
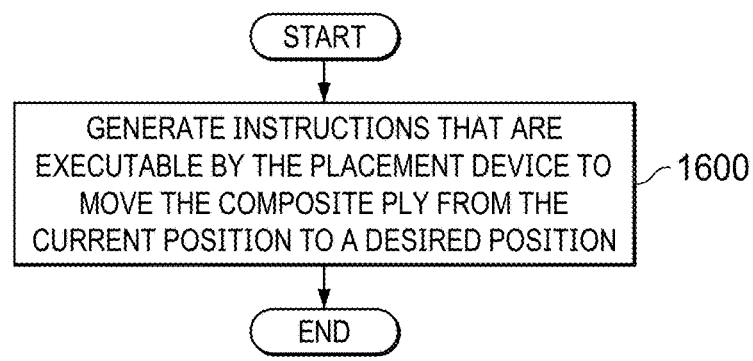
FIG. 16 is an illustration of a flowchart of a process for generating executable instructions to move a composite ply by a placement device in accordance with an illustrative embodiment.

Turning to FIG. 16, an illustration of a flowchart of a process for generating executable instructions to move a composite ply by a placement device is depicted in accordance with an illustrative embodiment. The process depicted in FIG. 16 is an example of an implementation of operation 1302 in FIG. 13.

The process generates instructions that are executable by the placement device to move the composite ply from the current position to a desired position (operation 1600). The process terminates thereafter.

Figure 17:
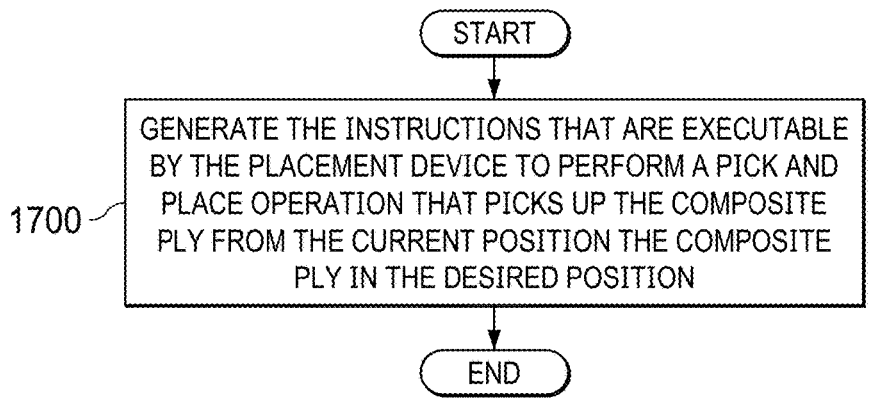
FIG. 17 is an illustration of a flowchart of a process for generating executable instructions to perform a pick and place operation by a placement device in accordance with an illustrative embodiment.

With reference to FIG. 17, an illustration of a flowchart of a process for generating executable instructions to perform a pick and place operation by a placement device is depicted in accordance with an illustrative embodiment. The process depicted in FIG. 17 is an example of an implementation of operation 1600 in FIG. 16.

The process generates the instructions that are executable by the placement device to perform a pick and place operation that picks up the composite ply from the current position the composite ply in the desired position (operation 1700). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
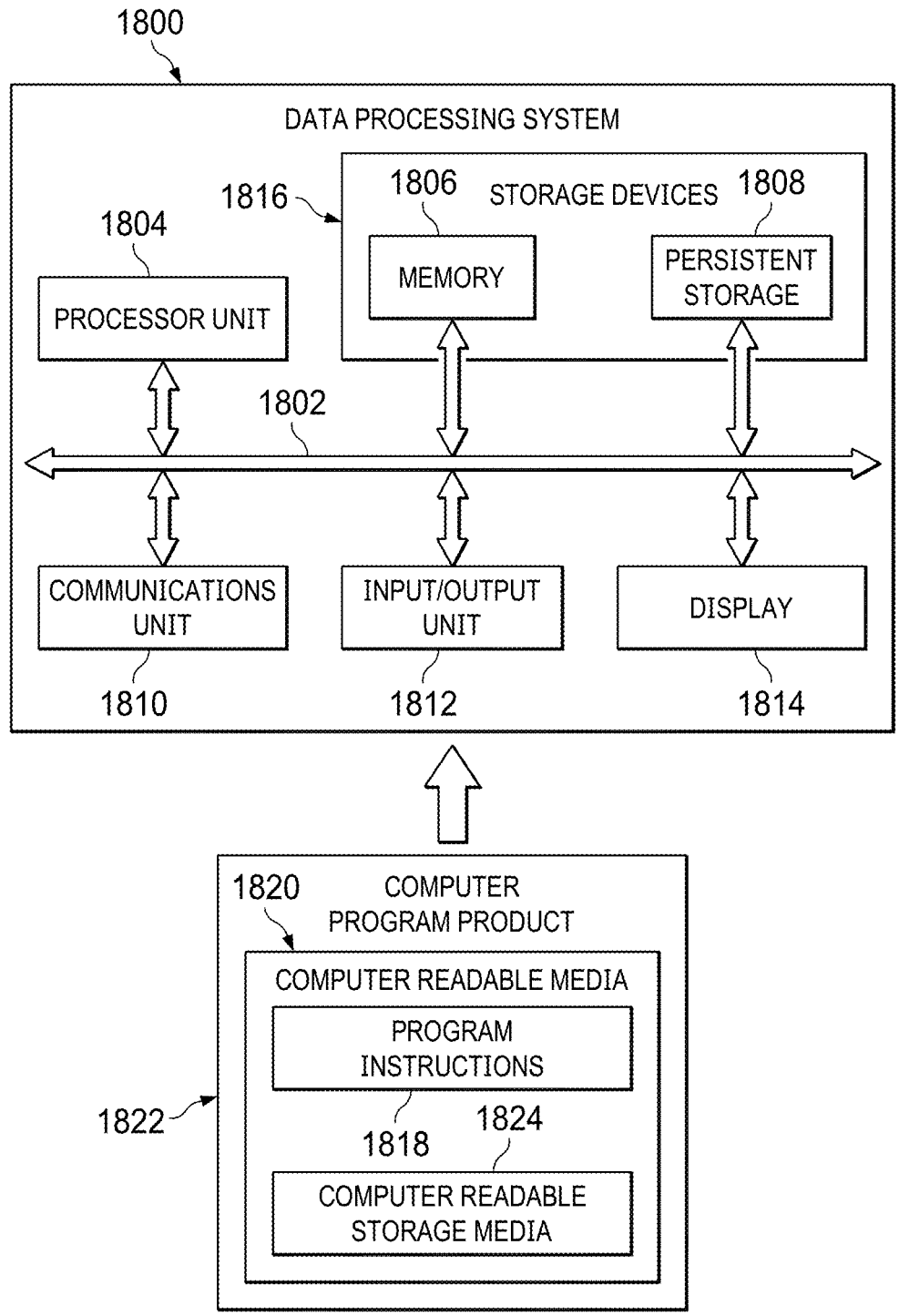
FIG. 18 is an illustration of a block diagram of a data processing system in accordance with an illustrative embodiment.

Turning now to FIG. 18, a block diagram of a data processing system is depicted in accordance with an illustrative embodiment. Data processing system 1800 can be used to implement computer system 110 and computer 274 in FIG. 2.

In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which may be located in a memory, such as memory 1806.

These instructions are referred to as program instructions, computer usable program instructions, or computer-readable program instructions that can be read and executed by a processor in processor unit 1804. The program instructions in the different embodiments can be embodied on different physical or computer-readable storage media, such as memory 1806 or persistent storage 1808.

Program instructions 1818 is located in a functional form on computer-readable media 1820 that is selectively removable and can be loaded onto or transferred to data processing system 1800 for execution by processor unit 1804. Program instructions 1818 and computer-readable media 1820 form computer program product 1822 in these illustrative examples. In the illustrative example, computer-readable media 1820 is computer-readable storage media 1824.

Computer-readable storage media 1824 is a physical or tangible storage device used to store program instructions 1818 rather than a medium that propagates or transmits program instructions 1818. Computer-readable storage media 1824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1818 can be transferred to data processing system 1800 using a computer-readable signal media. The computer-readable signal media are signals and can be, for example, a propagated data signal containing program instructions 1818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1820" can be singular or plural. For example, program instructions 1818 can be located in computer-readable media 1820 in the form of a single storage device or system. In another example, program instructions 1818 can be located in computer-readable media 1820 that is distributed in multiple data processing systems. In other words, some instructions in program instructions 1818 can be located in one data processing system while other instructions in program instructions 1818 can be located in one data processing system. For example, a portion of program instructions 1818 can be located in computer-readable media 1820 in a server computer while another portion of program instructions 1818 can be located in computer-readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, may be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program instructions 1818.

Figure 19:
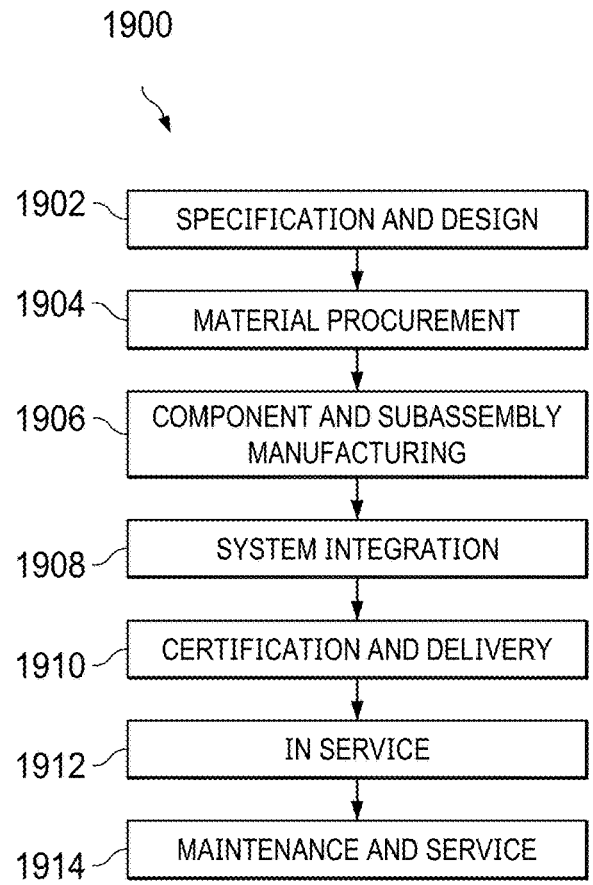
FIG. 19 is an illustration of an aircraft manufacturing and service method in accordance with an illustrative embodiment.
Figure 20:
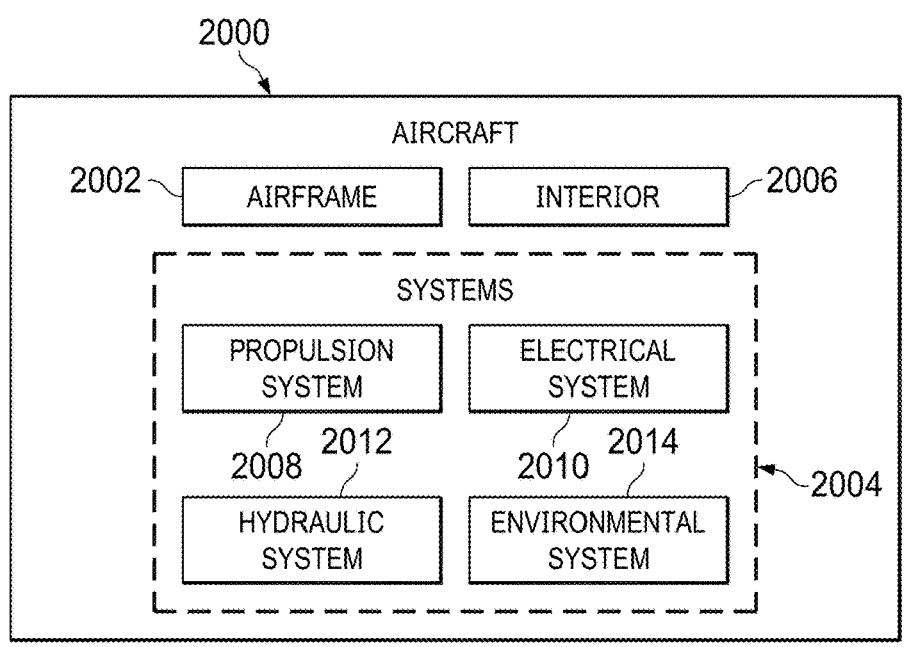
FIG. 20 is an illustration of a block diagram of an aircraft in which an illustrative embodiment may be implemented.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 can go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft is depicted in which an illustrative embodiment may be implemented. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 can be fabricated or manufactured in a manner similar to components or subassemblies produced while aircraft 2000 is in service 1912 in FIG. 19. As yet another example, one or more apparatus embodiments, method embodiments, or a combination thereof can be utilized during production stages, such as component and subassembly manufacturing 1906 and system integration 1908 in FIG. 19. One or more apparatus embodiments, method embodiments, or a combination thereof may be utilized while aircraft 2000 is in service 1912, during maintenance and service 1914 in FIG. 19, or both. The use of a number of the different illustrative embodiments may substantially expedite the assembly of aircraft 2000, reduce the cost of aircraft 2000, or both expedite the assembly of aircraft 2000 and reduce the cost of aircraft 2000.

For example, composite part manufacturing environment 100 in FIG. 1 and composite manufacturing system 200 in FIG. 2 can be used during component and subassembly manufacturing 1906 to manufacture composite parts. The use of natural features can reduce the amount of rework or discarding of composite parts or charges or preforms for composite parts. As another example, composite part manufacturing environment 100 in FIG. 1 and composite manufacturing system 200 in FIG. 2 can be used during maintenance and service 1914 to manufacture composite parts for various maintenance and service operations that may include modification, reconfiguration, refurbishment, and other maintenance or service.

Figure 21:
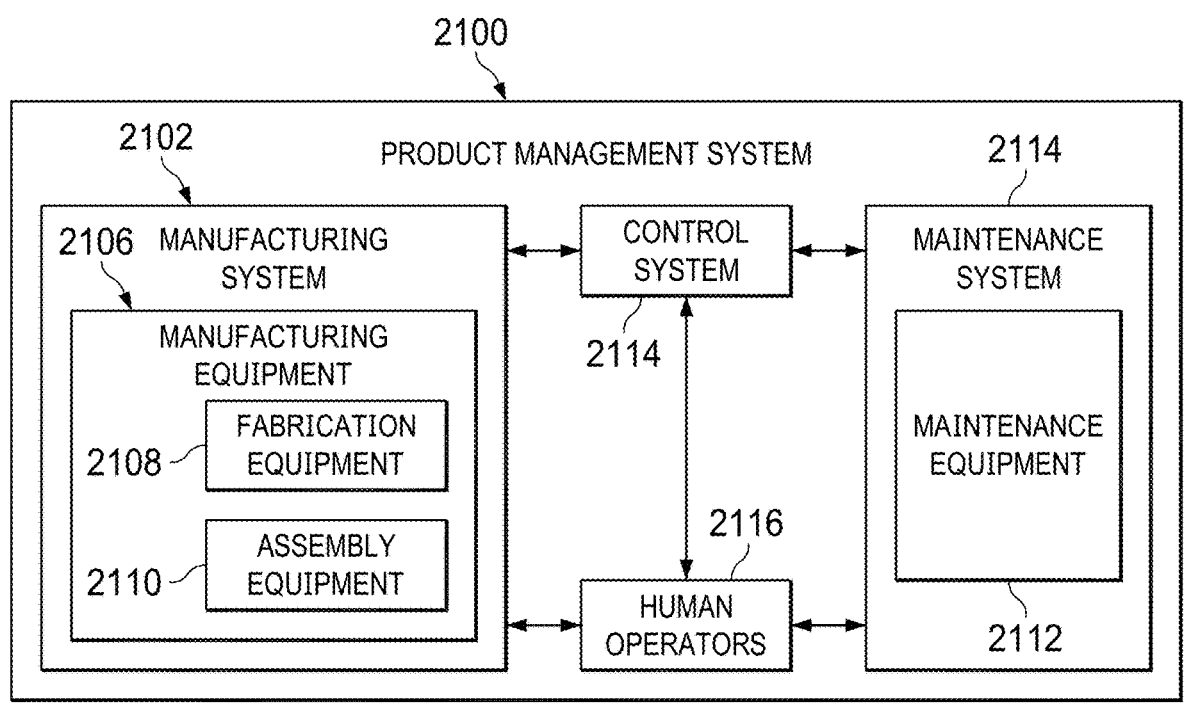
FIG. 21 is an illustration of a block diagram of a product management system is depicted in accordance with an illustrative embodiment.

Turning now to FIG. 21, an illustration of a block diagram of a product management system is depicted in accordance with an illustrative embodiment. Product management system 2100 is a physical hardware system. In this illustrative example, product management system 2100 includes at least one of manufacturing system 2102 or maintenance system 2104.

Manufacturing system 2102 is configured to manufacture products, such as aircraft 2000 in FIG. 20. As depicted, manufacturing system 2102 includes manufacturing equipment 2106. Manufacturing equipment 2106 includes at least one of fabrication equipment 2108 or assembly equipment 2110.

Fabrication equipment 2108 is equipment that is used to fabricate components or parts used to form aircraft 2000 in FIG. 20. For example, fabrication equipment 2108 can include machines and tools. These machines and tools can be at least one of a drill, a hydraulic press, a furnace, an autoclave, a mold, a composite tape laying machine, an automated fibre placement (AFP) machine, a vacuum system, a robotic pick and place system, a flatbed cutting machine, a laser cutter, a computer numerical control (CNC) cutting machine, a lathe, or other suitable types of equipment. Fabrication equipment 2108 can be used to fabricate at least one of metal parts, composite parts, semiconductors, circuits, fasteners, ribs, skin panels, spars, antennas, or other suitable types of parts.

Assembly equipment 2110 is equipment used to assemble parts to form aircraft 2000 in FIG. 20. In particular, assembly equipment 2110 is used to assemble components and parts to form aircraft 2000 in FIG. 20. Assembly equipment 2110 also can include machines and tools. These machines and tools may be at least one of a robotic arm, a crawler, a fastener installation system, a rail-based drilling system, or a robot. Assembly equipment 2110 can be used to assemble parts such as seats, horizontal stabilizers, wings, engines, engine housings, landing gear systems, and other parts for aircraft 2000 in FIG. 20.

In this illustrative example, maintenance system 2104 includes maintenance equipment 2112. Maintenance equipment 2112 can include any equipment needed to perform maintenance on aircraft 2000 in FIG. 20. Maintenance equipment 2112 may include tools for performing different operations on parts on aircraft 2000 in FIG. 20. These operations can include at least one of disassembling parts, refurbishing parts, inspecting parts, reworking parts, manufacturing replacement parts, or other operations for performing maintenance on aircraft 2000 in FIG. 20. These operations can be for routine maintenance, inspections, upgrades, refurbishment, or other types of maintenance operations.

In the illustrative example, maintenance equipment 2112 may include ultrasonic inspection devices, x-ray imaging systems, vision systems, drills, crawlers, and other suitable devices. In some cases, maintenance equipment 2112 can include fabrication equipment 2108, assembly equipment 2110, or both to produce and assemble parts that needed for maintenance.

Product management system 2100 also includes control system 2114. Control system 2114 is a hardware system and may also include software or other types of components. Control system 2114 is configured to control the operation of at least one of manufacturing system 2102 or maintenance system 2104. In particular, control system 2114 can control the operation of at least one of fabrication equipment 2108, assembly equipment 2110, or maintenance equipment 2112.

The hardware in control system 2114 can be implemented using hardware that may include computers, circuits, networks, and other types of equipment. The control may take the form of direct control of manufacturing equipment 2106. For example, robots, computer-controlled machines, and other equipment can be controlled by control system 2114. In other illustrative examples, control system 2114 can manage operations performed by human operators 2116 in manufacturing or performing maintenance on aircraft 2000. For example, control system 2114 can assign tasks, provide instructions, display models, or perform other operations to manage operations performed by human operators 2116. In these illustrative examples, fabrication controller 112 in FIG. 1 and program 276 in FIG. 2 can be implemented in control system 2114 to manage at least one of the manufacturing or maintenance of aircraft 2000 in FIG. 20. For example, at least one of fabrication controller 112 in FIG. 1 and program 276 in FIG. 2 can operate to control the manufacture composite parts using fabrication equipment 2108 in manufacturing equipment 2106.

In the different illustrative examples, human operators 2116 can operate or interact with at least one of manufacturing equipment 2106, maintenance equipment 2112, or control system 2114. This interaction can occur to manufacture aircraft 2000 in FIG. 20.

Of course, product management system 2100 may be configured to manage other products other than aircraft 2000 in FIG. 20. Although product management system 2100 has been described with respect to manufacturing in the aerospace industry, product management system 2100 can be configured to manage products for other industries. For example, product management system 2100 can be configured to manufacture products for the automotive industry as well as any other suitable industries.

Some features of the illustrative examples are described in the following clauses. These clauses are examples of features and are not intended to limit other illustrative examples.

Clause 1

A method for processing a composite ply comprising:
receiving, by a computer system, an image of the composite ply;
detecting, by the computer system, natural features in the image of the composite ply; and
saving, by the computer system, feature data for the natural features detected in association with a ply identifier for the composite ply in a repository, wherein the feature data is used to position the composite ply during manufacturing of a composite part using the composite ply.

Clause 2

The method according to clause 1 further comprising:
detecting, by the computer system, the natural features in areas in the image; and
generating, by the computer system, the feature data for the natural features using the areas, wherein the feature data describes the natural features detected in the areas in the image.

Clause 3

The method according to clauses 1 or 2, wherein the feature data comprises at least one of a vector describing a natural feature in the natural features, a ply identifier for the composite ply, a current position of the composite ply, coordinates identifying positions of the natural features within the image, or the image of the composite ply.

Clause 4

The method according to clauses 1, 2, or 3, wherein the natural features are detected in a region in the image, wherein the region in the image is selected to reduce matching errors.

Clause 5

The method according to clauses 1, 2, 3, or 4 further comprising:
performing, by the computer system, a set of manufacturing operations using the feature data for the natural features detected in the image of the composite ply.

Clause 6

The method according to clauses 1, 2, 3, 4, or 6, wherein the image is a first image of the composite ply in a current position and the feature data is first feature data and further comprising:
receiving, by the computer system, a second image of the composite ply for a placement device, wherein the second image is for a device position of the placement device;
detecting, by the computer system, the natural features in the second image;
determining, by the computer system, an offset between the first feature data for the natural features in the first image of the composite ply at the current position and second natural feature data for the natural features in the second image of the composite ply at a device position of the placement device; and
moving, by the computer system, the placement device from the device position to the current position using the offset.

Clause 7

The method according to clauses 1, 2, 3, 4, 5, or 6, wherein the natural features detected are within windows and wherein image data for the image in the windows is used to generate the feature data.

Clause 8

The method according to clauses 1, 2, 3, 4, 5, 6, or 7, wherein detecting, by the computer system, the natural features in the image of the composite ply comprises:
detecting, by the computer system, the natural features in the image of the composite ply using a computer vision process that detects features in images.

Clause 9

The method according to clauses 1, 2, 3, 4, 5, 6, 7, or 8, wherein the composite ply is processed to form the composite part for a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 10

A method for processing a composite ply, the method comprising:
detecting, by a computer system, natural features on the composite ply in a first image of the composite ply, wherein the first image is generated by a camera at a current position for the composite ply; and
positioning, by the computer system, the composite ply by a placement device using the natural features detected in a second image generated for the placement device at a device position for the placement device.

Clause 11

The method according to clause 10 further comprising:
generating, by the computer system, the second image of the composite ply by the placement device at the device position;
detecting, by the computer system, the natural features in the second image of the composite ply;
determining, by the computer system, an offset between the natural features in the first image and the second image; and
moving, by the computer system, the placement device from the device position to a current position using the offset, wherein the placement device positions the composite ply from the current position, wherein the placement device positions the composite ply in response to moving the current position of the composite ply.

Clause 12

The method according to clauses 10 or 11 further comprising:
cutting, by the computer system, the composite ply to have a shape at a time selected from one of prior to identifying the natural features and after identifying the natural features.

Clause 13

The method according to clauses 10, 11, or 12, wherein positioning, by the computer system, the composite ply by the placement device using the natural features detected in the second image generated for the placement device at the device position for the placement device comprises:
generating, by the computer system, instructions that are executable by the placement device to move the composite ply from the current position to a desired position.

Clause 14

The method according to clause 13, wherein generating, by the computer system, the instructions that are executable by the placement device to move the composite ply from the current position to the desired position comprises:
generating, by the computer system, the instructions that are executable by the placement device to perform a pick and place operation that picks up the composite ply from the current position the composite ply in the desired position.

Clause 15

A composite manufacturing system comprising:
a computer system; and
a fabrication controller in the computer system, wherein the fabrication controller operates to:
receive an image of the composite ply;
detect natural features in the image of the composite ply; and
save feature data for the natural features detected in association with a ply identifier for the composite ply in a repository, wherein the feature data is used to position the composite ply during manufacturing of a composite part using the composite ply.

Clause 16

The composite manufacturing system according to clause 15, wherein the fabrication controller operates to:
detect the natural features in areas in the image; and
generate the feature data for the natural features using the areas, wherein the feature data describes the natural features detected in the areas in the image.

Clause 17

The composite manufacturing system according to clauses 15 or 16, wherein the feature data comprises at least one of a vector describing a natural feature in the natural features, a ply identifier for the composite ply, a current position of the composite ply, coordinates identifying positions of the natural features within the image, or the image of the composite ply.

Clause 18

The composite manufacturing system according to clauses 15, 16, or 17, wherein the natural features are detected in a region in the image, wherein the region in the image is selected to reduce matching errors.

Clause 19

The composite manufacturing system according to clauses 15, 16, 17, or 18, wherein the fabrication controller operates to:
perform a set of manufacturing operations using the feature data for the natural features detected in the image of the composite ply.

Clause 20

The composite manufacturing system according to clauses 15, 16, 17, 18, or 19, wherein the image is a first image of the composite ply in a current position and the feature data is first feature data, wherein the fabrication controller operates to:
generate a second image of the composite ply for a placement device, wherein the second image is for a device position of the placement device;
detect the natural features in the second image;
determine an offset between the first feature data for the natural features in the first image of the composite ply at the current position and second natural feature data for the natural features in the second image of the composite ply at a device position of the placement device; and
move the placement device from the device position to the current position using the offset.

Clause 21

The composite manufacturing system according to clauses 15, 16, 17, 18, 19, or 20, wherein in detecting the natural features in the image of the composite ply, the fabrication controller operates to:
detect the natural features in the image of the composite ply using a computer vision process that detects features in images.

Clause 22

The composite manufacturing system according to clauses 15, 16, 17, 18, 19, 20, or 21, wherein the composite ply is processed to form the composite part for a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 23

A composite manufacturing system for processing a composite ply, the composite manufacturing system comprising:

fabrication equipment; and a fabrication controller in a computer system that controls fabrication equipment to:

detect natural features on the composite ply in a first image of the composite ply, wherein the first image is generated by a camera at a current position for the composite ply; and position the composite ply by a placement device using the natural features detected in a second image generated for the placement device at a device position for the placement device.

Clause 24

The composite manufacturing system according to clause 23, wherein the fabrication controller controls the fabrication equipment to:

generate the second image of the composite ply by the placement device at the device position;

detect the natural features in the second image of the composite ply;

determine an offset between the natural features in the first image and the second image; and move the placement device from the device position to a current position using the offset, wherein the placement device positions the composite ply from the current position, wherein the placement device positions the composite ply in response to moving the current position of the composite ply.

Thus, illustrative embodiments provide a method, apparatus, system, and computer program product for processing the composite ply. An image of the composite ply is received. Natural features in the image of the composite ply are detected. Feature data for the natural features detected in association is saved with a ply identifier for the composite ply in a repository. The feature data is used to position the composite ply during manufacturing of a composite part using the composite ply.

The use of natural features as fiducial markers in the different illustrative examples is easier to implement and more accurate than other approaches such as using boundaries for determining movement of each component. In the illustrative examples, the composite ply can be cut to a desired shape, and natural features can be determined on composite ply with the desired shape. The determination of the natural features can be determined in the same location, such as in the same cell and on the same cutting machine. Further, determining locations using natural features is simpler as compared to extracting boundaries because boundaries of the composite plies can be fluffy or have loose threads at the boundaries. In the illustrative examples, a region can be selected in the image for use in determining natural features. This region can be selected to be closer to the center or away from the boundaries of the composite ply.

Additionally, with the use of natural features, the field of view of the camera is much smaller when only the section of the composite ply with the natural features needs to be inspected as compared to the entire composite ply boundaries being used. As a result, the use of natural features can result in a better pixels/mm resolution as compared to current techniques using boundaries. In other words, a greater density of pixels can be present in an image with natural features as compared to an image using ply boundaries. In other words, the image of the composite ply can be made using a smaller area of the composite ply resulting in a greater resolution of the portion of the composite ply that is captured in the image as compared to capturing a larger area to include the boundaries of the composite ply.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing a composite ply comprising:

receiving, by a computer system, an image of the composite ply;

detecting, by the computer system, natural features in the image of the composite ply; and saving, by the computer system, feature data for the natural features detected in association with a ply identifier for the composite ply in a repository, wherein the feature data is used to position the composite ply during manufacturing of a composite part using the composite ply.

2. The method of claim 1 further comprising:

detecting, by the computer system, the natural features in areas in the image; and generating, by the computer system, the feature data for the natural features using the areas, wherein the feature data describes the natural features detected in the areas in the image.

3. The method of claim 1, wherein the feature data comprises at least one of a vector describing a natural feature in the natural features, a ply identifier for the composite ply, a current position of the composite ply, coordinates identifying positions of the natural features within the image, or the image of the composite ply.

4. The method of claim 1, wherein the natural features are detected in a region in the image, wherein the region in the image is selected to reduce matching errors.

5. The method of claim 1 further comprising:

performing, by the computer system, a set of manufacturing operations using the feature data for the natural features detected in the image of the composite ply.

6. The method of claim 1, wherein the image is a first image of the composite ply in a current position and the feature data is first feature data and further comprising:

receiving, by the computer system, a second image of the composite ply for a placement device, wherein the second image is for a device position of the placement device;

detecting, by the computer system, the natural features in the second image;

determining, by the computer system, an offset between the first feature data for the natural features in the first image of the composite ply at the current position and second feature data for the natural features in the second image of the composite ply at a device position of the placement device; and moving, by the computer system, the placement device from the device position to the current position using the offset.

7. The method of claim 1, wherein the natural features detected are within windows and wherein image data for the image in the windows is used to generate the feature data.

8. The method of claim 1, wherein detecting, by the computer system, the natural features in the image of the composite ply comprises:

detecting, by the computer system, the natural features in the image of the composite ply using a computer vision process that detects features in images.

9. The method of claim 1, wherein the composite ply is processed to form the composite part for a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

10. A method for processing a composite ply, the method comprising:

detecting, by a computer system, natural features on the composite ply in a first image of the composite ply, wherein the first image is generated by a camera at a current position for the composite ply; and positioning, by the computer system, the composite ply by a placement device using the natural features detected in a second image generated for the placement device at a device position for the placement device.

11. The method of claim 10 further comprising:

generating, by the computer system, the second image of the composite ply by the placement device at the device position;

detecting, by the computer system, the natural features in the second image of the composite ply;

determining, by the computer system, an offset between the natural features in the first image and the second image; and moving, by the computer system, the placement device from the device position to a current position using the offset, wherein the placement device positions the composite ply from the current position, wherein the placement device positions the composite ply in response to moving the current position of the composite ply.

12. The method of claim 10 further comprising: cutting, by the computer system, the composite ply to have a shape at a time selected from one of prior to identifying the natural features and after identifying the natural features.

13. The method of claim 10, wherein positioning, by the computer system, the composite ply by the placement device using the natural features detected in the second image generated for the placement device at the device position for the placement device comprises:

generating, by the computer system, instructions that are executable by the placement device to move the composite ply from the current position to a desired position.

14. The method of claim 13, wherein generating, by the computer system, the instructions that are executable by the placement device to move the composite ply from the current position to the desired position comprises:

generating, by the computer system, the instructions that are executable by the placement device to perform a pick and place operation that picks up the composite ply from the current position the composite ply in the desired position.

15. A composite manufacturing system comprising:

a computer system; and a fabrication controller in the computer system, wherein the fabrication controller operates to:

receive an image of the composite ply;

detect natural features in the image of the composite ply; and save feature data for the natural features detected in association with a ply identifier for the composite ply in a repository, wherein the feature data is used to position the composite ply during manufacturing of a composite part using the composite ply.

16. The composite manufacturing system of claim 15, wherein the fabrication controller operates to:

detect the natural features in areas in the image; and generate the feature data for the natural features using the areas, wherein the feature data describes the natural features detected in the areas in the image.

17. The composite manufacturing system of claim 15, wherein the feature data comprises at least one of a vector describing a natural feature in the natural features, a ply identifier for the composite ply, a current position of the composite ply, coordinates identifying positions of the natural features within the image, or the image of the composite ply.

18. The composite manufacturing system of claim 15, wherein the natural features are detected in a region in the image, wherein the region in the image is selected to reduce matching errors.

19. The composite manufacturing system of claim 15, wherein the fabrication controller operates to:

perform a set of manufacturing operations using the feature data for the natural features detected in the image of the composite ply.

20. The composite manufacturing system of claim 15, wherein the image is a first image of the composite ply in a current position and the feature data is first feature data, wherein the fabrication controller operates to:

generate a second image of the composite ply for a placement device, wherein the second image is for a device position of the placement device;

detect the natural features in the second image;

determine an offset between the first feature data for the natural features in the first image of the composite ply at the current position and second feature data for the natural features in the second image of the composite ply at a device position of the placement device; and move the placement device from the device position to the current position using the offset.

21. The composite manufacturing system of claim 15, wherein in detecting the natural features in the image of the composite ply, the fabrication controller operates to:

detect the natural features in the image of the composite ply using a computer vision process that detects features in images.

22. The composite manufacturing system of claim 15, wherein the composite ply is processed to form the composite part for a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

23. A composite manufacturing system for processing a composite ply, the composite manufacturing system comprising:
    fabrication equipment; and
    a fabrication controller in a computer system that controls the fabrication equipment to:
    detect natural features on the composite ply in a first image of the composite ply, wherein the first image is generated by a camera at a current position for the composite ply; and
    position the composite ply by a placement device using the natural features detected in a second image generated for the placement device at a device position for the placement device.

24. The composite manufacturing system of claim 23, wherein the fabrication controller controls the fabrication equipment to:
    generate the second image of the composite ply by the placement device at the device position;
    detect the natural features in the second image of the composite ply;
    determine an offset between the natural features in the first image and the second image; and
    move the placement device from the device position to a current position using the offset, wherein the placement device positions the composite ply from the current position, wherein the placement device positions the composite ply in response to moving the current position of the composite ply.

* * * * *